United States Patent
Satsukawa et al.

(10) Patent No.: US 6,379,249 B1
(45) Date of Patent: Apr. 30, 2002

(54) IMAGE GENERATION DEVICE AND INFORMATION STORAGE MEDIUM

(75) Inventors: Takashi Satsukawa; Naohito Hanai, both of Yokohama; Masahide Kawakami, Kawasaki; Atsushi Hayashi, Yokohama, all of (JP)

(73) Assignee: Namco Ltd., Tokyo (JP)

(*) Notice: Subject to any disclaimer, the term of this patent is extended or adjusted under 35 U.S.C. 154(b) by 0 days.

(21) Appl. No.: 09/207,920

(22) Filed: Dec. 9, 1998

(30) Foreign Application Priority Data

Dec. 12, 1997 (JP) .............................................. 9-362735

(51) Int. Cl.$^7$ ................................................. A63F 9/00
(52) U.S. Cl. ............................... 463/31; 463/1; 463/2; 463/5; 463/7; 463/8; 463/36; 463/37; 463/38; 463/39; 463/30; 463/32; 463/34; 273/148 B; 345/418; 345/419
(58) Field of Search ............................ 463/1–8, 36–39, 463/49–57, 30–34; 273/148 B; 345/418, 419

(56) References Cited

U.S. PATENT DOCUMENTS

| | | | |
|---|---|---|---|
| 4,572,509 A | | 2/1986 | Sitrick |
| 4,625,290 A | * | 11/1986 | White ........................ 364/522 |
| 4,738,451 A | * | 4/1988 | Logg ...................... 273/153 R |
| 4,976,438 A | * | 12/1990 | Tashiro et al. ................. 463/34 |
| 5,190,286 A | * | 3/1993 | Watanabe et al. ............... 463/5 |
| 5,299,810 A | * | 4/1994 | Pierce et al. ................. 273/434 |
| 5,411,270 A | * | 5/1995 | Naka et al. .................. 273/434 |
| 5,411,272 A | * | 5/1995 | Naka et al. .................. 273/437 |
| 5,470,080 A | * | 11/1995 | Naka et al. .................. 273/437 |
| 5,775,998 A | * | 7/1998 | Ikematsu et al. .............. 463/52 |
| 5,853,324 A | | 12/1998 | Kami et al. |
| 5,956,180 A | * | 9/1999 | Bass et al. ................... 359/479 |

FOREIGN PATENT DOCUMENTS

| | | |
|---|---|---|
| EP | 0 836872 A2 | 4/1998 |
| JP | A-7-24141 | 1/1995 |
| JP | 8019664 | 1/1996 |
| JP | 8038740 | 2/1996 |
| JP | A-8-155139 | 6/1996 |
| JP | A-8-155142 | 6/1996 |
| JP | A-8-303997 | 11/1996 |
| JP | A-8-332280 | 12/1996 |
| JP | 8-303997 | * 2/1997 |
| JP | A-9-75552 | 3/1997 |
| JP | A-9-166417 | 6/1997 |
| JP | A-9-313737 | 12/1997 |
| JP | A-9-313738 | 12/1997 |

* cited by examiner

Primary Examiner—Jessica J. Harrison
Assistant Examiner—Yveste G. Cherubin
(74) Attorney, Agent, or Firm—Oliff & Berridge PLC

(57) ABSTRACT

An image generation device and an information storage medium that make it possible to increase the virtual realism and dramatic effect of a shooting, game in an efficient manner. A plurality of objects such as target objects are set within an object space, and a hit check is performed on shots from 1P and 2P players and the target objects. First and second viewpoints for the 1P and 2P players are controlled and images as seen from those first and second viewpoints are output to first and second display screens, respectively. Although the viewpoints of the 1P and 2P players are the same in the prior art, they can be made different in this game. The first and second viewpoints move along first and second movement paths, and the first and second viewpoints are controlled in such a manner that the first and second movement paths diverge when a given circumstance occurs. The configuration is such that a target object and a character object representing one player can enter into the field of view of the other player. The first and second viewpoints and the target object are controlled in accordance with a difference in game results between the 1P and 2P players.

26 Claims, 24 Drawing Sheets

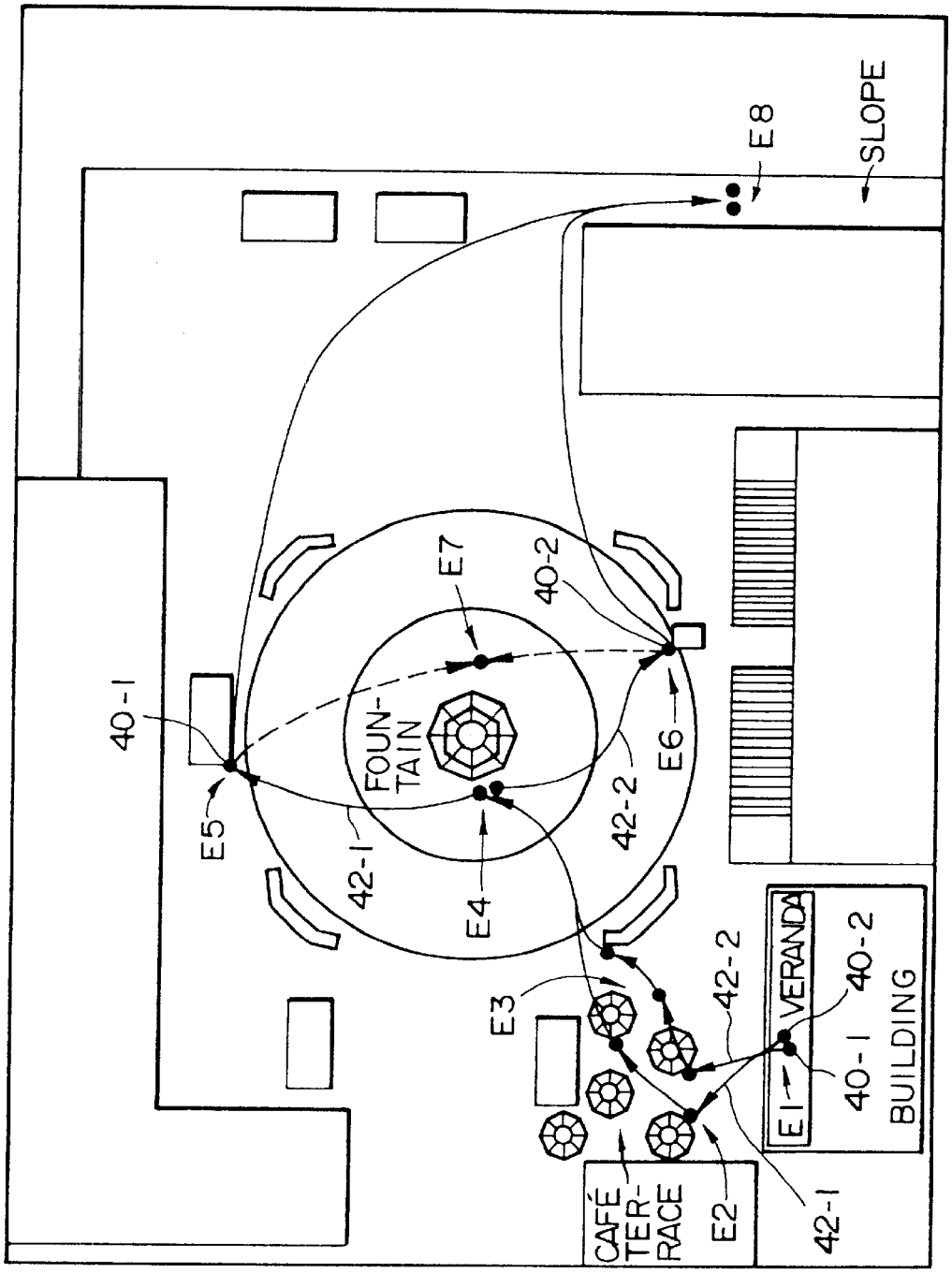

FIRST DISPLAY SCREEN    SECOND DISPLAY SCREEN

FIRST DISPLAY SCREEN    SECOND DISPLAY SCREEN 60-2                                           60-1

"ACTION!"

FIRST DISPLAY SCREEN    SECOND DISPLAY SCREEN 60-2    60-1

52-3  52-2

52-1    "ACTION!"

FIRST DISPLAY SCREEN    SECOND DISPLAY SCREEN 60-1

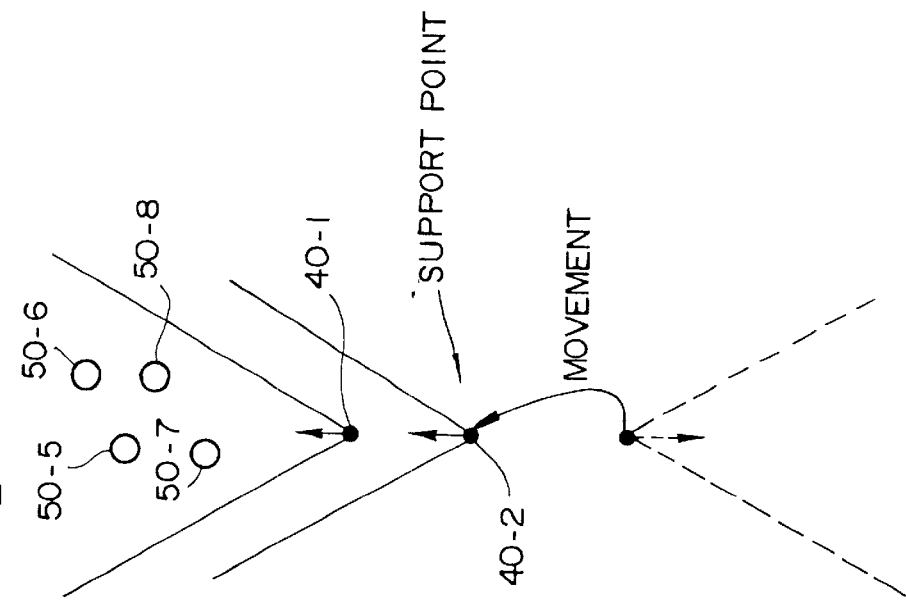
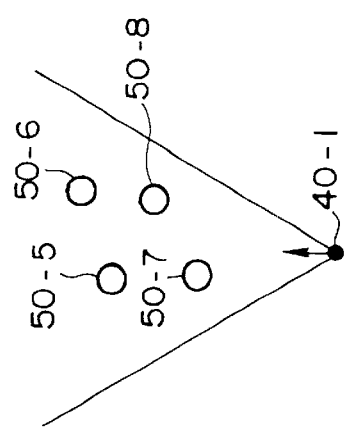

HIGHER GAME RESULT   LOWER GAME RESULT

IMAGE GENERATION DEVICE AND INFORMATION STORAGE MEDIUM

BACKGROUND OF THE INVENTION

1. Field of the Invention

This invention relates to an image generation device and an information storage medium for generating an image that enables a player to use a shooting device to shoot at a target object within an object space.

2. Description of Related Art

Image generation devices have been developed and implemented in the art, to enable a player to use a shooting device such as a handgun-shaped controller to shoot at a target object. When a player 520 pulls a trigger of a handgun-shaped controller 522 of such an image generation device, as shown in FIG. 1A, a two-dimensional position on a display screen 512 that is indicated by the handgun-shaped controller 522 is optically detected. If the thus-detected two-dimensional position matches the position of a two-dimensional target object that is displayed on the screen, this is determined to be a hit; if it does not match, this is determined to be a miss. This image generation device makes it possible for a player to enjoy the virtual experience of target-shooting or gun-fighting without using a real firearm, so it is highly popular as a game.

When a plurality of players play on an image generation device of this type (with a multi-player game), first and second players 520-1 and 520-2 both use the same display screen 512 in common, as shown in FIG. 1B. In other words, the viewpoints of the first and second players 520-1 and 520-2 within the object space are the same, and the first and second players 520-1 and 520-2 shoot by aiming at a target object seen from the same viewpoint.

With the method shown in FIG. 1B, however, the viewpoints of the first and second players 520-1 and 520-2 within the object space are the same, unlike in the real world. This makes it impossible to further heighten the players' experience of a virtual reality.

In addition, since the images seen by the first and second players 520-1 and 520-2 are always the same, it is also impossible to increase the dramatic effect of the game any further.

SUMMARY OF THE INVENTION

This invention was devised in the light of the above described technical concerns and has as an objective thereof the provision of an image generation device and information storage medium that make it possible to heighten the virtual realism and the dramatic effect of the game in an efficient manner.

In order to address the above technical concerns, this invention relates to an image generation device for generating an image that enables a player to use a shooting device to shoot at at least one target object within an object space. This image generation device comprises: means for performing processing for setting a plurality of objects, including a target object, within the object space; means for performing a hit check between a shot from a first player and a target object; means for performing a hit check between a shot from a second player and a target object; means for controlling a first viewpoint for the first player; means for controlling a second viewpoint for the second player; means for generating an image as seen from the first viewpoint within the object space and outputting the generated image to a first display screen for the first player; and means for generating an image as seen from the second viewpoint within the object space and outputting the generated image to a second display screen for the second player.

With this aspect of this invention, the first player can enjoy shooting at target objects while watching an image as seen from a first viewpoint in the object space and the second player can also enjoy shooting at target objects while watching an image as seen from a second viewpoint in the object space. This enables a huge increase in the players' feeling of virtual realism and the dramatic effect of the game, unlike in the prior-art example in which the viewpoints of the first and second players are the same. It also makes it possible to prevent the displayed images from becoming too uniform, further increasing the degree of variety of the images. It is also possible to create differences in the virtual realities experienced by the first and second players.

Note that the scope of this invention also covers an implementation in which each of the hit check, viewpoint control, and image generation is performed by a single means instead two means each.

The first and second viewpoints may be controlled in such a manner that the first viewpoint moves along a given first movement path and the second viewpoint moves along a given second movement path. This independent control of the first and second viewpoints makes it possible to provide different images to be seen by the first and second players, which increases the dramatic effect of the game.

The first movement path of the first viewpoint and the second movement path of the second viewpoint may be made to diverge when a given circumstance occurs. Such a configuration makes it possible to set scenarios such as one in which the first and second players shoot at target objects from completely different places within the object space, which increases the degree of variety of images.

Character objects corresponding to each of the first and second players may be provided within the object space; and, when a given circumstance occurs, the viewpoint of one of the first and second players may be controlled in such a manner that a target object and the character object corresponding to the other of the first and second players both enter into the field of view of the viewpoint of the one of the first and second players. Such a configuration makes it possible to strengthen the sensation of playing cooperatively with another player, which increases the degree of absorption of the player in the game.

At least one of the first viewpoint, the second viewpoint, and a target object may be controlled in accordance with a difference in game results between the first and second players. Such a configuration makes it possible to generate different images and move the game forward in different ways, depending on game results that reflect the abilities of the players, which further increases the dramatic effect of the game.

When a target object that is present within the field of view as seen from one of the viewpoints of the first and second players has been destroyed but a target object that is present within the field of view as seen from the other of the viewpoints has not been destroyed, the one of the viewpoints may be controlled in such a manner that the target object that is present within the field of view as seen from the other of the viewpoints enters the field of view as seen from the one of the viewpoints. Such a configuration makes it possible to set scenarios such as one in which one player can support the other player.

When a target object that is present within the field of view as seen from one of the viewpoints of the first and second players has been destroyed, target object control may be performed in such a manner that a target object enters the field of view as seen from the one of the viewpoints. Such a configuration makes it possible to prevent the occurrence of a situation in which one player has to wait for the other player to finish playing the game.

When a game result of one of the first and second players is greater than a game result of the other of the players, one of the viewpoints may be made to proceed in advance of the other of the viewpoints. Such a configuration makes it possible to stimulate a competitive feeling between the players, which increases the players' enthusiasm and degree of absorption in the game.

When one of the viewpoints is proceeding in advance of the other of the viewpoints, a target object may be caused to appear within the field of view of the other of the viewpoints, in a region between the one viewpoint and the other viewpoint. Such a configuration makes it possible to control the appearance of target objects in accordance with a difference between game results.

Character objects corresponding to each of the first and second players may be provided within the object space; and, when a shot from one of the first and second players has hit the character object corresponding to the other of the first and second players, an image that is output to a display screen provided for the other player may be made to change. Such a configuration makes it possible to convey to the other player that one player has mistakenly shot him.

A check may be performed to determine whether or not a shot from the first player has hit a target object, based on a first trajectory specified by the first viewpoint and a two-dimensional position on the first display screen that is indicated by a shooting device of the first player; and a check may be performed to determine whether or not a shot from the second player has hit a target object, based on a second trajectory specified by the second viewpoint and a two-dimensional position on the second display screen that is indicated by a shooting device of the second player. Such a configuration makes it possible to cause changes in the motion of a target object in accordance with the first and second trajectories and so on, which increases the realism of images.

BRIEF DESCRIPTION OF THE DRAWINGS

FIG. 5 shows an example of a game stage for a gun-wielding game that is implemented by this embodiment;

FIGS. 14A and 14B illustrate a method of causing a viewpoint to move to a support point;

DESCRIPTION OF PREFERRED EMBODIMENTS

Preferred embodiments of this invention will now be described with reference to the accompanying drawings.

Note that, although the description below concerns a configuration in which there are two display screens, the present invention is not limited to that number of display screens and three or more display screens could equally well be provided. It is also possible to allocate a plurality of players to a single display screen. The description below also concerns an example in which this invention is applied to a gun-wielding game such that players can use handgun-shaped controllers to enjoy a gun battle, but this invention can also be applied to other shooting games other than gun-wielding games. It can be applied to other shooting games such as one in which controllers modeled in the shape of rifles are used instead of the handgun-shaped controllers, or in which shooting devices are fixed to a housing of a game machine.

Figure 2:
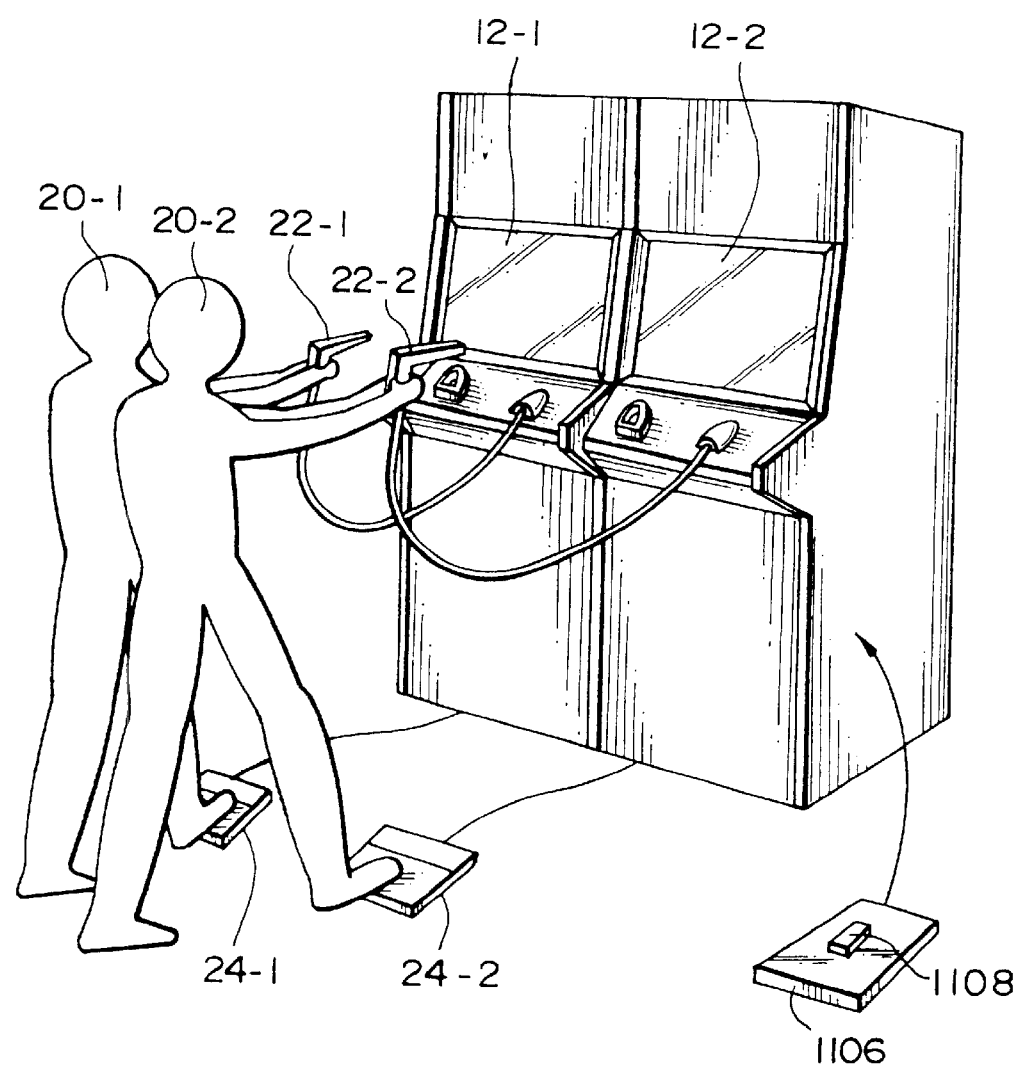
FIG. 2 shows an example of the external appearance of an image generation device of one embodiment of this invention.

An example of the external appearance of an arcade game machine when the image generation device of this embodiment is applied thereto is shown in FIG. 2.

A first characteristic of this embodiment is described below. This embodiment is provided with a first display screen 12-1 for a first player (hereinafter called the "1P player") 20-1 and a second display screen 12-2 for a second player (hereinafter called the "2P player") 20-2, as shown in FIG. 2. Images as seen from a first viewpoint in an object space are displayed on the first display screen 12-1 and images as seen from a second viewpoint in the object space are displayed on the second display screen 12-2. The 1P player 20-1 enjoys a gun-wielding game by using a handgun-shaped controller (shooting device) 22-1 to shoot at a target object that appears on the first display screen 12-1. Similarly, the 2P player 20-2 enjoys the gun-wielding game by using a handgun-shaped controller 22-2 to shoot at a target object that appears on the second display screen 12-2.

Note that, in this embodiment, character objects (virtual players) corresponding to the players on the display screens 12-1 and 12-2 can be made to duck down and stand up (lower and raise the viewpoints thereof), by stepping on pedals 24-1 and 24-2. This makes it possible to perform actions such as using an obstacle to avoid an attack from a target (enemy) object.

This first characteristic of the embodiment enables the 1P player 20-1 and the 2P player 20-2 to enjoy the gun-wielding game while viewing images from mutually different viewpoints. This enables a great improvement in the degree of virtual realism and the dramatic effect of the game over the prior-art machine shown in FIG. 1B.

Figure 1A:
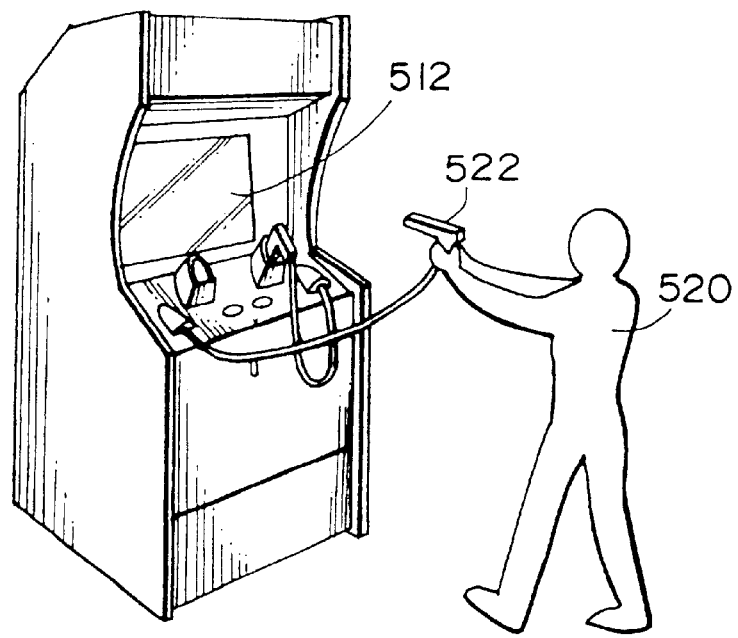
FIGS. 1A and 1B are views illustrating problems with a prior-art gun-wielding game.
Figure 1B:
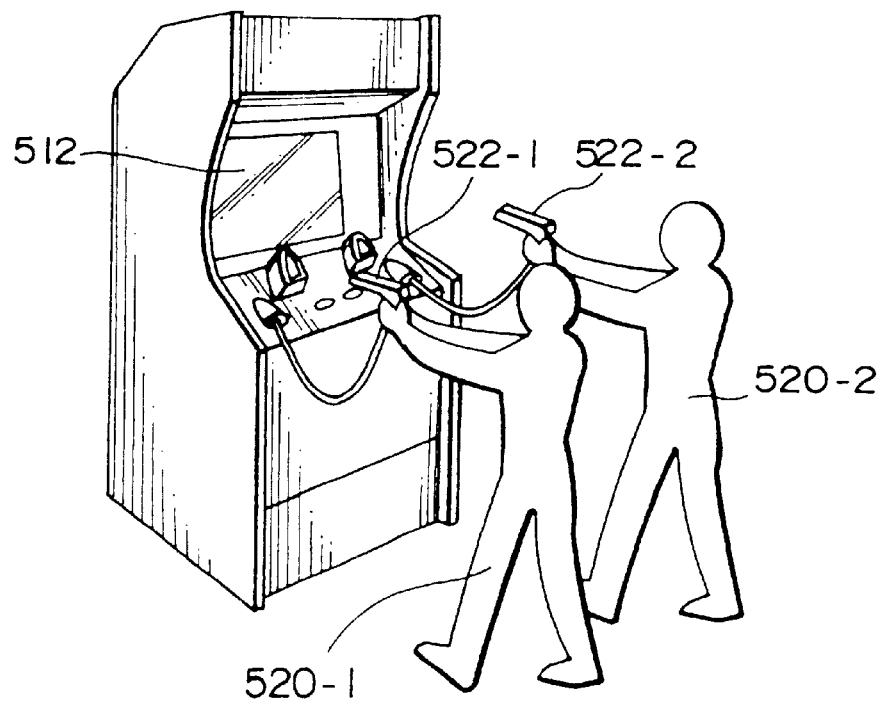

In other words, the first and second players 520-1 and 520-2 see images from the same viewpoint with the game machine of FIG. 1B, and it is impossible to increase the virtual reality experience even further. In contrast thereto, this embodiment shown in FIG. 2 enables the 1P and 2P players 20-1 and 20-2 to see images from mutually different viewpoints, in a similar manner to the real world. As a result, it is possible to obtain a genuine feeling of experiencing a gun battle in the real world, which greatly improves the degree of virtual realism.

In addition, the first and second players 520-1 and 520-2 in FIG. 1B always see the same images, so that the game dramatization ends up as being uniformly monotonous. With this embodiment of the invention, in contrast, the first viewpoint created for the first display screen 12-1 and the second viewpoint created for the second display screen 12-2 can be controlled independently. Thus the images displayed on the first display screen 12-1 and the images displayed on the second display screen 12-2 can be made mutually different. In other words, it is possible to achieve a game dramatization such that an image as seen from the front of a target object is displayed on the first display screen 12-1, for example, and an image as seen from the rear of the target object is displayed on the second display screen 12-2. It is also possible to achieve a game dramatization such that a target object appears from the left side of the first display screen 12-1 and a target object appears from the right side of the second display screen 12-2. This means that the variety of images presented to the players can be increased, and thus the dramatic effect of the game can be greatly heightened.

Furthermore, this embodiment makes it possible to experience different virtual realities when playing the game while viewing the first display screen 12-1 and when playing the game while viewing the second display screen 12-2. This means that a player who has played the game once from the first display screen 12-1 side can look forward to playing the game again from the second display screen 12-2 side. As a result, the efficiency of the image generation device in the game equipment can be increased.

Figure 3:
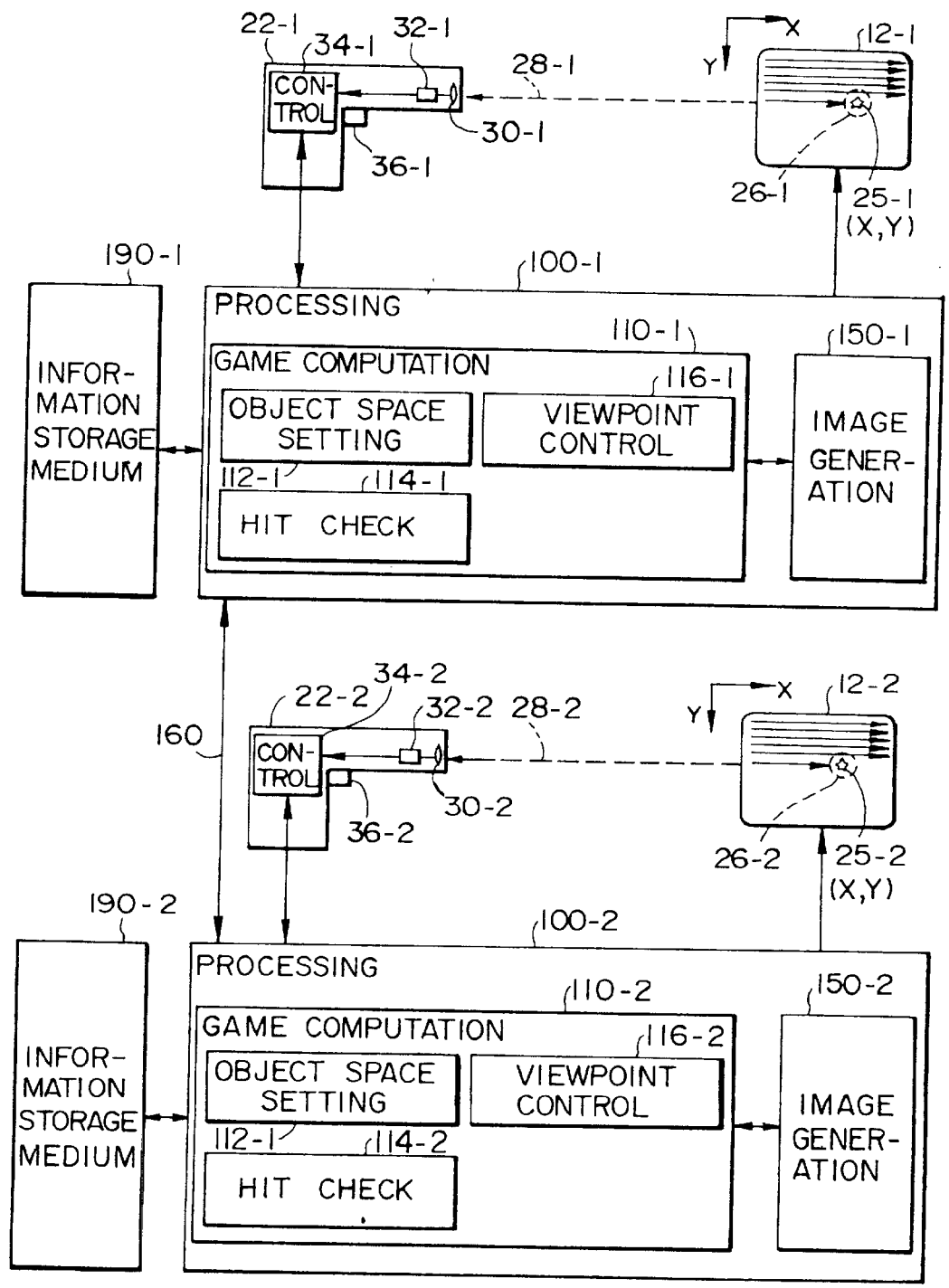
FIG. 3 shows an example of the functional block diagram of the image generation device of this embodiment.

An example of a functional block diagram of the image generation device of this embodiment is shown in FIG. 3.

In this case, the handgun-shaped controllers 22-1 and 22-2 are each formed to have a hollow shape, lenses 30-1 and 30-2 are provided in the respective tips thereof, and photosensors 32-1 and 32-2 are provided in the respective interiors thereof. This configuration ensures that light beams 28-1 and 28-2 from the directions in which the respective handgun-shaped controllers 22-1 and 22-2 are pointing can be detected by the photosensors 32-1 and 32-2. When the 1P and 2P players 20-1 and 20-2 (see FIG. 2) point the respective handgun-shaped controllers 22-1 and 22-2 towards the first and second display screens 12-1 and 12-2 and pull triggers 36-1 and 36-2, the corresponding first and second display screens 12-1 and 12-2 are made to flash. This flashing of the display screens makes it possible to ensure that light has been detected by the handgun-shaped controllers 22-1 and 22-2. When the raster scan of each of the first and second display screens 12-1 and 12-2 passes through detection areas 26-1 and 26-2 of a given size around each of indicated positions 25-1 and 25-2 of the handgun-shaped controllers 22-1 and 22-2 (the positions at which the handgun-shaped controllers 22-1 and 22-2 are pointing), this scan beam is detected by the corresponding photosensors 32-1 and 32-2. The photosensors 32-1 and 32-2 then output detection pulses.

The handgun-shaped controllers 22-1 and 22-2 comprise control sections 34-1 and 34-2, respectively. Each of these control sections 34-1 and 34-2 comprises components such as an X counter and a Y counter (not shown in the figure). The detection pulses from the photosensors 32-1 and 32-2 are input to the corresponding control sections 34-1 and 34-2. The control sections 34-1 and 34-2 detect the X and Y coordinates of indicated (landing) positions 25-1 and 25-2 of the respective handgun-shaped controllers 22-1 and 22-2, based on data such as these detection pulses, a clock signal, a horizontal synchronization signal, and a vertical synchronization signal Note that the function of detecting the X and Y coordinates of each of the indicated positions 25-1 and 25-2 could be possessed by the handgun-shaped controllers 22-1 and 22-2 as described above, or it could be possessed by processing sections 100-1 and 100-2.

Each of the processing sections 100-1 and 100-2 performs processing such as that for disposing objects within the object space, performing a hit check, and generating an image as seen from a given viewpoint of the object space, based on the input data from the handgun-shaped controllers 22-1 and 22-2 and a given program. The functions of these processing sections 100-1 and 100-2 could be implemented by hardware such as a CPU (either CISC or RISC), a DSP, a custom IC (such as a gate array), or memory.

Information storage media 190-1 and 190-2 have the role of storing programs and data. The functions of these information storage media 190-1 and 190-2 could be implemented by hardware such as a CD-ROM, game cassette, IC card, magneto-optical disk, floppy disk, digital video disk, hard disk, or memory. The processing sections 100-1 and 100-2 perform the various processing thereof based on programs and data from these information storage media 190-1 and 190-2.

The processing sections 100-1 and 100-2 comprise corresponding game computation sections 110-1 and 110-2 and image generation sections 150-1 and 150-2.

In this case, the game computation sections 110-1 and 110-2 perform the various processing required during the game, such as setting the game mode, moving the game forward, disposing the objects within the object space, performing a hit check, and determining the viewpoint position and line-of-sight direction.

The image generation sections 150-1 and 150-2 each generates and outputs an image as seen from a given viewpoint within the object space as set by the corresponding game computation sections 110-1 and 110-2. The images generated by the image generation sections 150-1 and 150-2 are displayed on the corresponding first and second display screens 12-1 and 12-2.

The game computation sections 110-1 and 110-2 comprise corresponding object space setting sections 112-1 and 112-2, hit check sections 114-1 and 114-2, and viewpoint control sections 116-1 and 116-2.

In this case, each of the object space setting sections 112-1 and 112-2 performs processing for setting objects such as target objects, character objects (virtual players), background objects, and map objects within the object space. More specifically, each determines the disposition of background objects and map objects with respect to the game stage, causes target objects to appear in the corresponding player's field of view as the game progresses, and moves the character objects around.

Each of the hit check sections 114-1 and 114-2 checks whether a shot from the corresponding 1P or the 2P player has hit a target object. More specifically, first and second trajectories of shots are obtained from indicated positions 25-1 and 25-2 of the handgun-shaped controllers 22-1 and 22-2 (see FIG. 3) and the first and second viewpoints of the 1P and 2P players, for example. A check on whether each shot has hit a target object is based an whether or not the corresponding first or second trajectory intersects the target object.

The viewpoint control sections 116-1 and 116-2 control the corresponding first and second viewpoints of the 1P and 2P players. More specifically, the positions of the first and second viewpoints and the line-of-sight direction and field of view as seen from each of the first and second viewpoints are controlled on the basis of a given viewpoint control program and viewpoint control data. In this embodiment of the invention, this control over the first and second viewpoints by the corresponding viewpoint control sections 116-1 and 116-2 is successful in supplying a wide variety of different images to each of the 1P and 2P players.

Note that the processing sections 100-1 and 100-2 of this embodiment transfer necessary data through a communications line 160. The transferred data includes data concerning the results of hit checks, by way of example. If the setup is such that only one of these processing sections controls a target object, that processing section sends details about the target object, such as its position, direction, and type, to the other processing section over this communications line 160.

Figure 4:
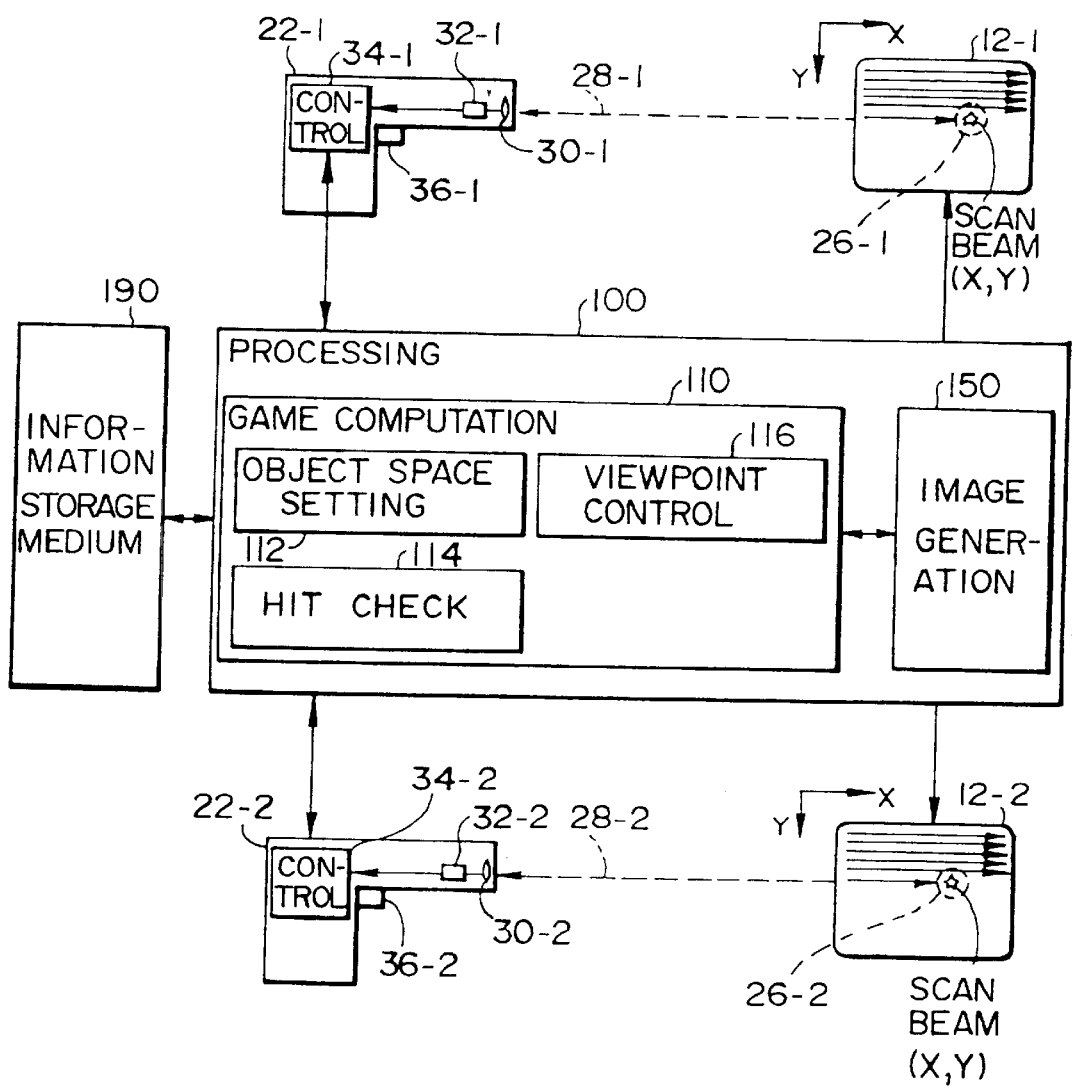
FIG. 4 shows another example of the functional block diagram of the image generation device.

It should be noted that the configuration of the image generation device of this invention is not limited to that shown in FIG. 3, and thus it can be implemented in other ways, such as that shown in FIG. 4, by way of example. In this figure, the functions of the processing sections 100-1 and 100-2 and the information storage media 190-1 and 190-2 are fulfilled by a processing section 100 and an information storage medium 190. A hit check section 114 performs both a hit check between a target object and a shot from the 1P player and a hit check between a target object and a shot from the 2P player, for example. Similarly, a viewpoint control section 116 controls both the first viewpoint of the 1P player and the second viewpoint of the 2P player. An image generation section 150 generates both images to be output to the first display screen 12-1 and images to be output to the second display screen 12-2.

The description now turns to a gun-wielding game that is implemented by this embodiment of the invention.

A typical map of the game stage of this gun-wielding game is shown in FIG. 5. As shown in FIG. 5, first and second viewpoints 40-1 and 40-2 (character objects) of the 1P and 2P players move along given movement paths 42-1 and 42-2, respectively. Control over the movements of the first and second viewpoints 40-1 and 40-2 in this case is based on a given viewpoint control program and viewpoint control data. The line-of-sight direction and field of view as seen from each of the first and second viewpoints 40-1 and 40-2 are also controlled. This ensures that varied images can be supplied to each player.

Examples of images that are generated by this embodiment and displayed on the first and second display screens 12-1 and 12-2 are shown schematically in FIG. 6A to FIG. 11B.

Figure 6A:
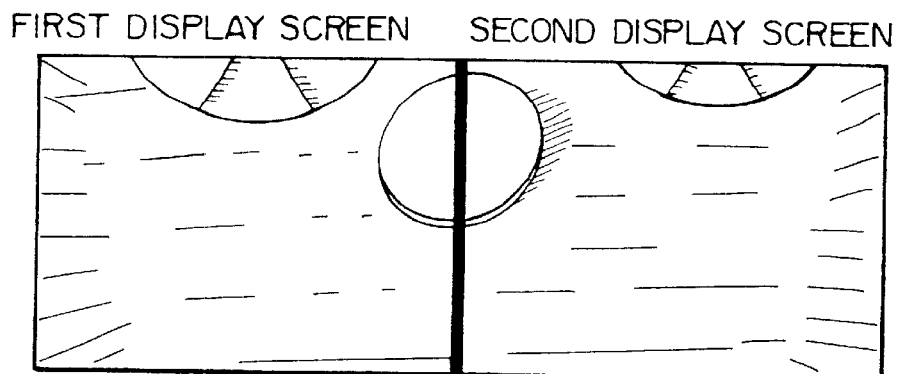
FIGS. 6A, 6B, 6C, and 6D are schematic impressions of images generated by this embodiment.
Figure 6B:
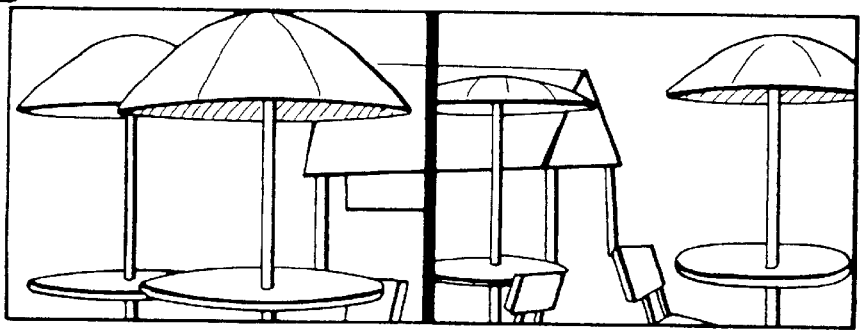

FIGS. 6A and 6B show examples of the images seen when the first and second viewpoints 40-1 and 40-2 are positioned at E1 and E2, respectively, of FIG. 5. The character objects of the 1P and 2P players, who are chasing an enemy boss, jump down from the veranda of a building and move onto a cafe terrace. Note that the fields of view of the 1P and 2P players do not overlap in the first and second display screens shown in FIGS. 6A and 6B, but these fields of view could overlap if required.

Figure 6C:
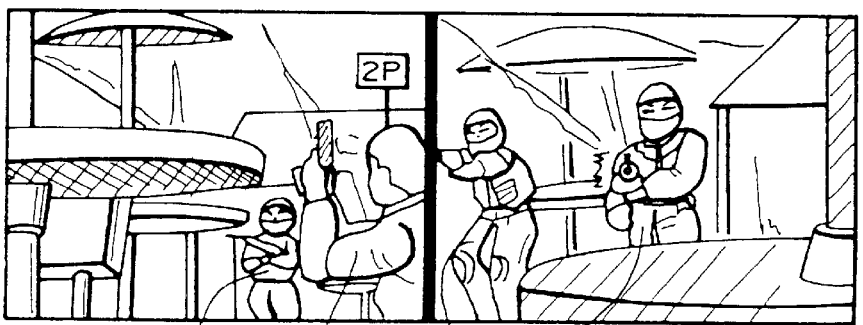

When a combat point on the cafe terrace is reached, target (enemy) objects 50-1 and 50-2 appear, as shown in FIG. 6C. At that point, a game sound "Action!" is heard and a gun battle starts. The 1P and 2P players 20-1 and 20-2 aim and shoot at the target objects 50-1 and 50-2 with the respective handgun-shaped controllers 22-1 and 22-2. The players can make the corresponding character objects rise by stepping on the pedals 24-1 and 24-2. On the other hand, they can make the corresponding character objects duck down and hide behind an obstacle by removing their feet from the pedals 24-1 and 24-2. If a shot hits one of the target objects 50-1 and 50-2, an action occurs to indicate that the target object has been hit, as shown in FIG. 6D.

Figure 6D:
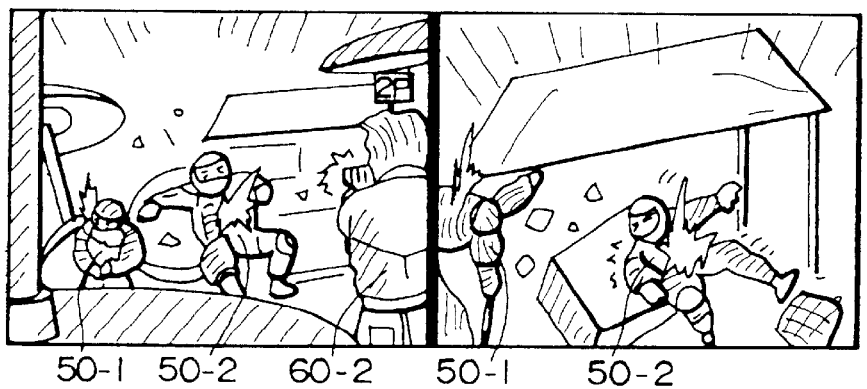

During this time, both a 2P character object 60-2 corresponding to the 2P player and the target objects 50-1 and 50-2 are displayed on the first display screen that the 1P player sees, as shown in FIGS. 6C and 6D. This configuration, which enables the 1P player to shoot at a target object while the 2P character object 60-2 is displayed on the first display screen, makes it possible to increase the feeling of a virtual reality by allowing the 1P player to cooperate with the 2P player in fighting the enemy. In other words, it is not possible to implement a virtual reality with such a level of cooperative play in the previously described game machine of FIG. 1B, because the viewpoints of the 1P and 2P players therein are the same. In contrast thereto, since this embodiment makes it possible to control the first and second viewpoints 40-1 and 40-2 independently, this kind of virtual reality can be implemented and thus the players can be given an even stronger sensation of participating in collaborative play.

Figure 7A:
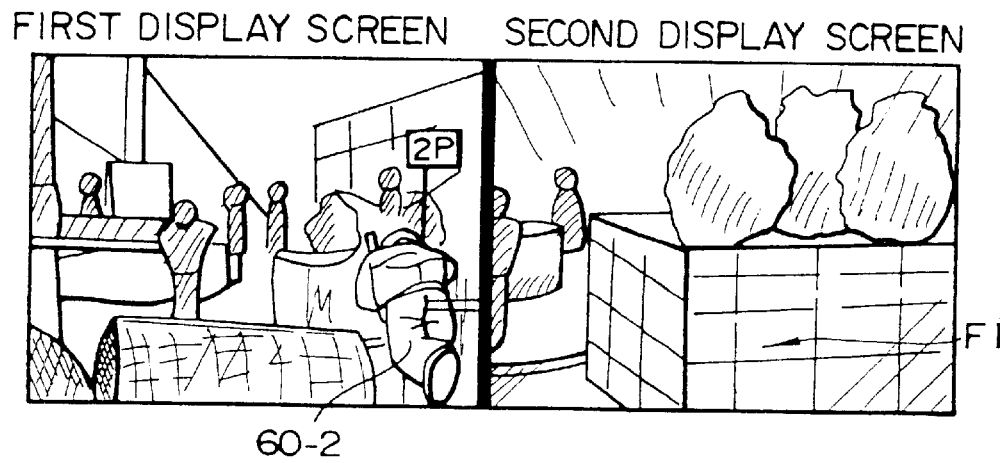
FIGS. 7A, 7B, and 7C are schematic impressions of more images generated by this embodiment.
Figure 7B:
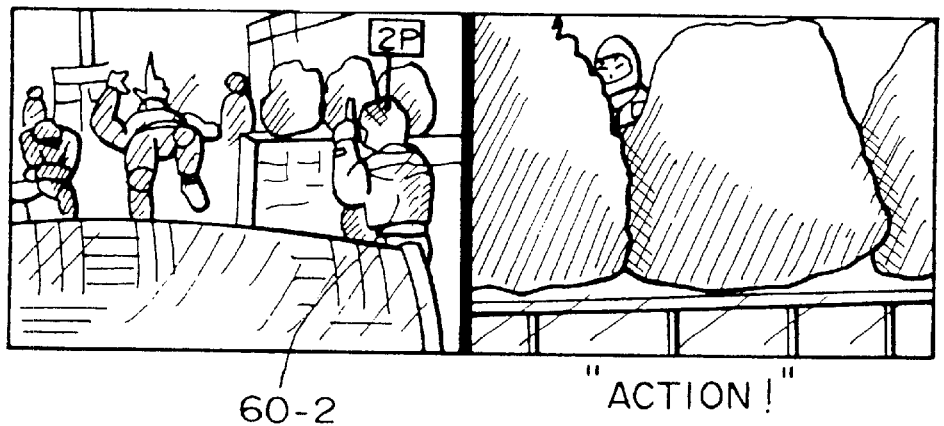
Figure 7C:
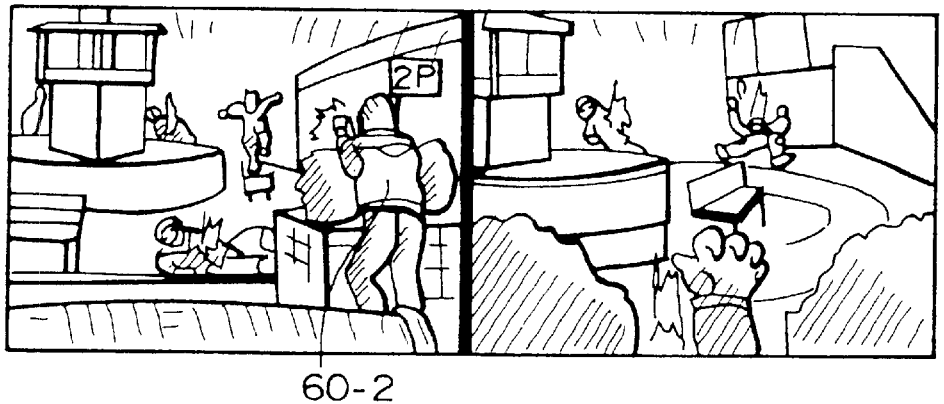

The combat point then moves from the position indicated by E2 in FIG. 5 to the position indicated by E3. At this point, the 2P character object 60-2 (the second viewpoint 40-2) moves first, then waits at the position indicated by F1, as shown in FIG. 7A. Subsequently, a gun battle against target objects starts, as shown in FIGS. 7B and 7C.

In this manner, this embodiment of the invention makes it possible for one of the first and second viewpoints 40-1 and 40-2 to wait and the other viewpoint to move forward alone. It is not possible to allow the viewpoint of one of the players to move forward alone in the game machine of FIG. 1B, because the viewpoints of the 1P and 2P players therein are the same. In contrast thereto, this embodiment of the invention enables independent control of the first and second viewpoints 40-1 and 40-2 so that various effects can be achieved, such as making one of these viewpoints move forward alone. It is therefore possible to implement a game scenario in which a target object can be attacked from different angles, such as by a pincer attack. As a result, the variety of game scenarios can be increased, which greatly improves the dramatic effect of the game.

Figure 8A:
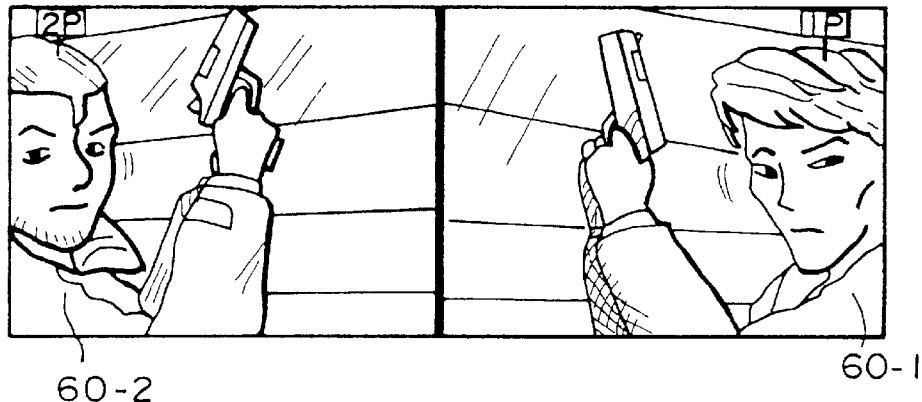
FIGS. 8A, 8B, and 8C are schematic impressions of even more images generated by this embodiment.

The first and second viewpoints 40-1 and 40-2 next move from the position indicated by E3 in FIG. 5 to the position indicated by E4. During this time, the facial expression of the 2P character object 60-2 is displayed on the first display screen seen by the 1P player and the facial expression of the 1P character object 60-1 is displayed on the second display screen seen by the 2P player, as shown in FIG. 8A. After the mutual nod shown in FIG. 8A, the first viewpoint 40-1 moves to the position indicated by E5 in FIG. 5 and the second viewpoint 40-2 moves to the position indicated by E6. After that, the first and second display screens display images such as those shown in FIG. 8B. The game sound "Action!" is again heard and a gun battle starts.

Figure 8B:
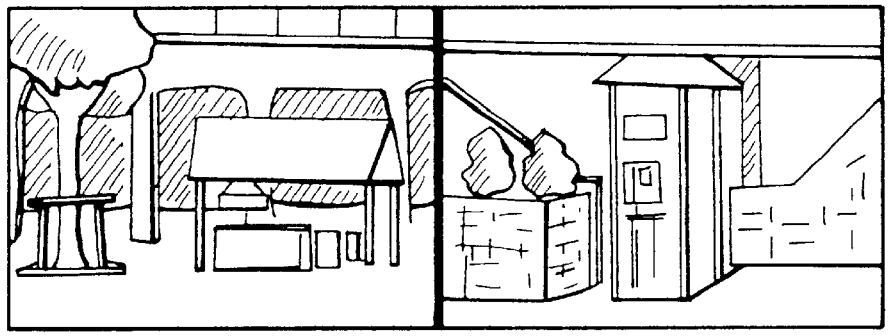
Figure 8C:

In the thus configured embodiment of this invention, the first and second movement paths 42-1 and 42-2 of the first and second viewpoints 40-1 and 40-2 can be made to diverge in completely different directions. This divergence cannot be implemented in the game machine of FIG. 1B because the viewpoints of the 1P and 2P players therein are the same. In contrast thereto, this embodiment enables independent control of the first and second viewpoints 40-1 and 40-2, so that the first and second movement paths 42-1 and 42-2 can diverge at any desired time. This makes it possible for the 1P and 2P players to experience completely different virtual realities, as shown in FIGS. 8B and 8C. As a result, a player who has played the game once from the first display screen 12-1 side can look forward to playing the game again from the second display screen 12-2 side, making it possible to provide a game that does not become boring when played repeatedly.

In addition, if the 2P player has completely destroyed a target object but the 1P player has not completely destroyed another target object, the second viewpoint 40-2 of the 2P player in this embodiment moves to a support point indicated by E7 in FIG. 5, as shown by way of example in FIG. 8C. Cooperative play starts, in which the 1P and 2P players can cooperate in shooting the target object that is within the field of view of the 1P player. Conversely, if the 1P player has completely destroyed a target object but the 2P player has not completely destroyed another target object, the first viewpoint 40-1 of the 1P player moves to the support point at E7 and cooperative play between the 1P and 2P players starts.

In the thus configured embodiment of this invention, details such as the first and second viewpoints 40-1 and 40-2 are controlled in accordance with a difference in game results (such as points gained, time taken to clear a level of the game, number of hits, number of misses, number of shots remaining, or remaining physical strength) between the 1P and 2P players. The game results of the 1P and 2P players can be made different to match the gaming abilities of each player. This embodiment makes it possible to provide images that reflect game results that have been adjusted in accordance with the gaming abilities of the players. In other words, if the game result of the 1P player is high, an image is generated in which the 1P player supports the 2P player; if the game result of the 2P player is high, an image is generated in which the 2P player supports the 1P player. This makes it possible to further increase the variety of images that can be provided for the players, which heightens the dramatic effect of the game.

Figure 9A:
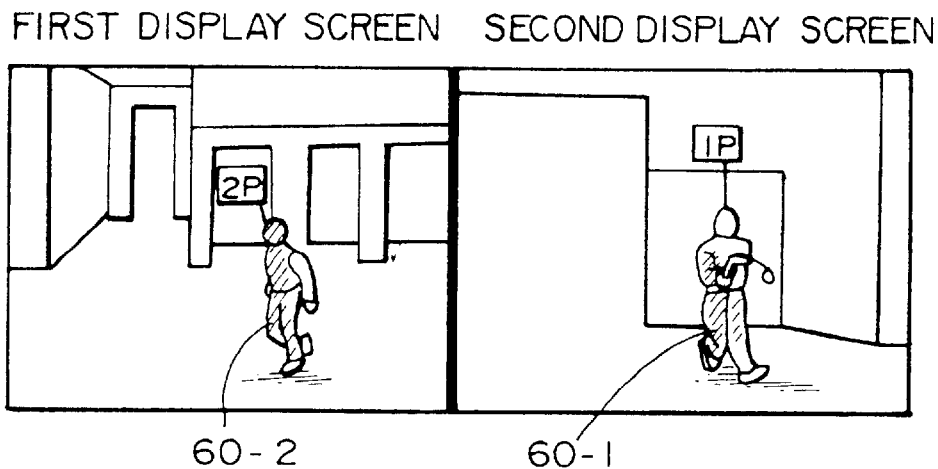
FIGS. 9A, 9B, and 9C are schematic impressions of further images generated by this embodiment.
Figure 9B:
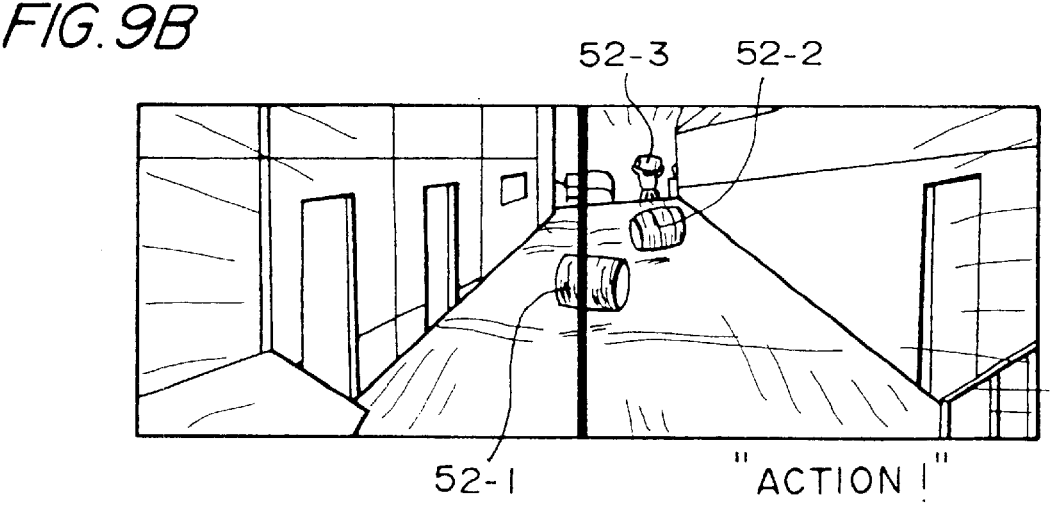
Figure 9C:
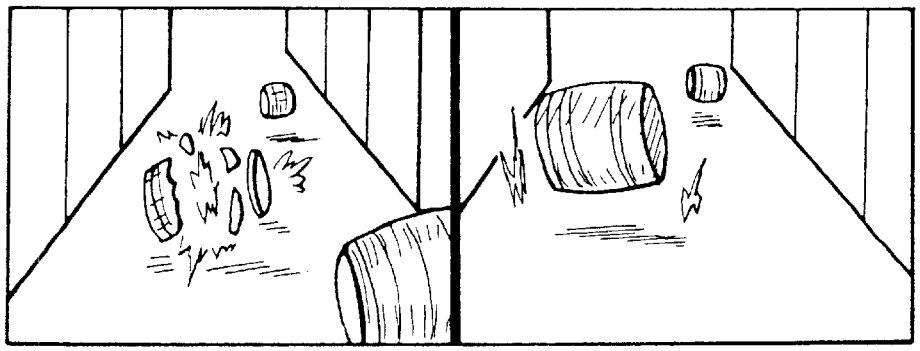

The first and second viewpoints 40-1 and 40-2 next move from the positions indicated by E5, E6, or E7 in FIG. 5 to the position indicated by E8. Examples of images displayed on the first and second display screens during this time are shown in FIG. 9A. When the position at E8 is reached, an enemy starts throwing target objects (barrels) 52-1, 52-2, and 52-3, as shown in FIG. 9B. When this happens, the 1P and 2P players start shooting at these target objects, as shown in FIG. 9C.

Note that, if the 1P and 2P players 20-1 and 20-2 step on the pedals 24-1 and 24-2 of FIG. 2 in this case, this embodiment allows the corresponding first and second viewpoints (character objects) to move forward. Thus this embodiment is configured in such a manner that the first and second viewpoints can move by the players control.

Figure 10A:
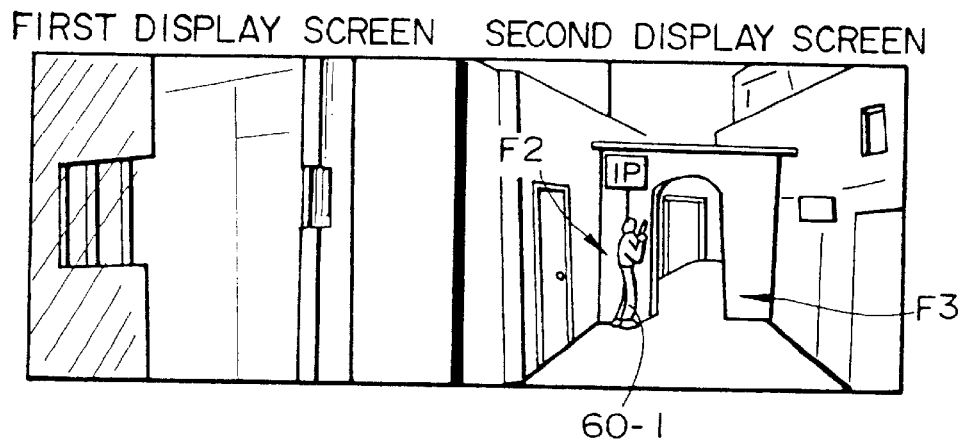
FIGS. 10A, 10B, and 10C are schematic impressions of yet further images generated by this embodiment.

At the end of the shooting at the target objects representing barrels, the character object of the player who clears this game first waits for the arrival of the character object of the other player, as shown at F2 in FIG. 10A. In this figure, the 1P player has cleared the game first so the 1P character object 60-1 waits at the F2 position. If, on the other hand, the 2P player clears the game first, the 2P character object waits at the F3 position. In the thus configured embodiment of this invention, the first and second viewpoints (character objects) are controlled in accordance with a difference between the game results of the 1P and 2P players. This makes it possible to increase the variety of game images that can be provided.

Figure 10B:
Figure 10C:
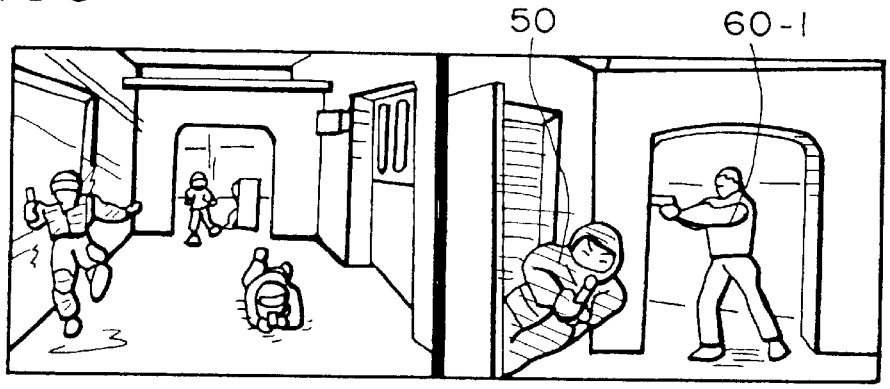

The 1P character object 60-1 (first viewpoint) of the 1P player with the higher game result then moves steadily forward ahead of the 2P character object (second viewpoint) of the 2P player with the lower game result, as shown in FIG. 10B. When the spacing between the 1P character object and the 2P character object exceeds a given distance, another target object 50 appears within the field of view of the second viewpoint (the second display screen), in a region between the 1P character object (first viewpoint) and the 2P character object (second viewpoint), as shown in FIG. 10C. With this embodiment of the invention, not only the first and second viewpoints but also target objects are controlled in accordance with a difference between the game results of the 1P and 2P players.

Figure 11A:
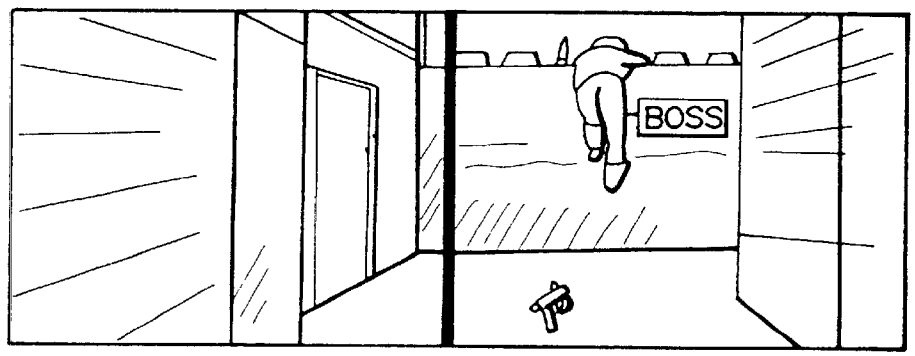
FIGS. 11A and 11B are schematic impressions of still further images generated by this embodiment.
Figure 11B:
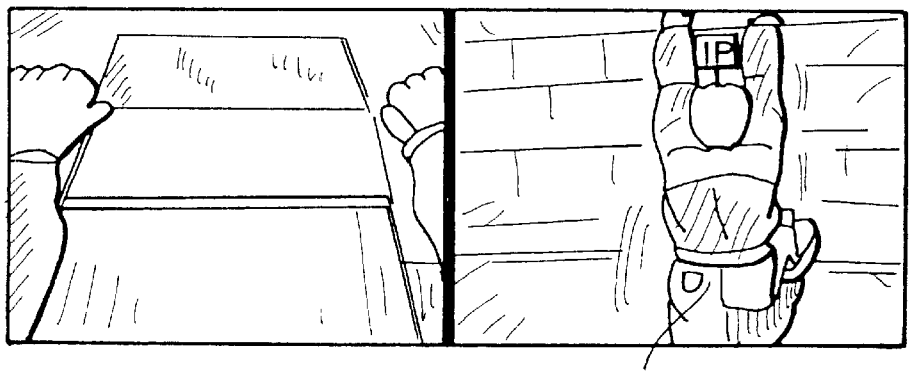

Images of a scenario in which the players have caught up with the enemy boss at a wall are shown in FIG. 11A. In this case, this embodiment ensures that the 1P character object 60-1 (first viewpoint) of the 1P player with the higher game result is the first to climb the wall and catch up with the enemy boss. The 2P character object of the 2P player with the lower game result climbs the wall later.

The thus configured embodiment of this invention makes it possible to provide various game images by controlling the first and second viewpoints and the target objects in accordance with a difference between game results, thus enabling a huge increase in the dramatic effect of the game. It is also possible to stimulate mutual rivalry between players while they are playing the game cooperatively, so that the players become more absorbed in the game.

The above embodiment has various characteristics.

A first characteristic is that the first and second display screens 12-1 and 12-2 are provided for the 1P and 2P players 20-1 and 20-2, as described with reference to FIG. 2, and images at first and second viewpoints are displayed on these first and second display screens 12-1 and 12-2. This makes it possible to implement various game dramatizations that cannot be achieved with the game machine of FIG. 1B.

Figure 12A:
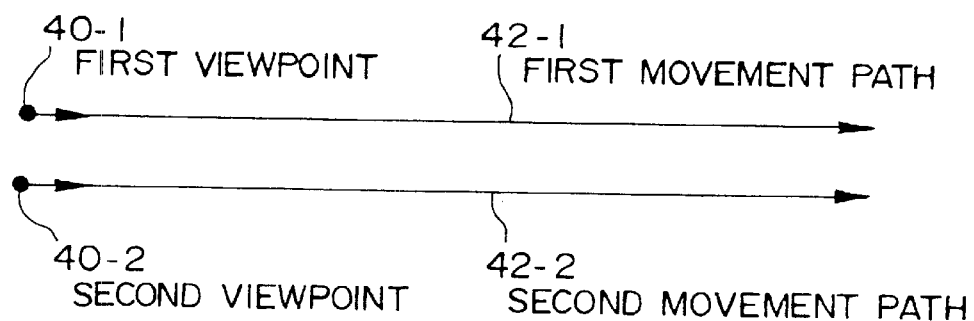
FIGS. 12A and 12B illustrate a method of moving first and second viewpoints along first and second movement paths, and causing the first and second movement paths to diverge.

A second characteristic is that the first and second viewpoints 40-1 and 40-2 are controlled in such a manner that the first viewpoint 40-1 moves along a first movement path 42-1 and the second viewpoint 40-2 moves along a second movement path 42-2, as shown in FIG. 12A. By controlling the first and second viewpoints 40-1 and 40-2 independently in this manner, it is possible to have one character object advance alone, as shown in FIGS. 7A, 10A, 10B, 10C, and 11B, or display the facial expression of one of the character objects on the other display screen, as shown in FIG. 8A. This enables a further increase in the variety of game images.

Figure 12B:
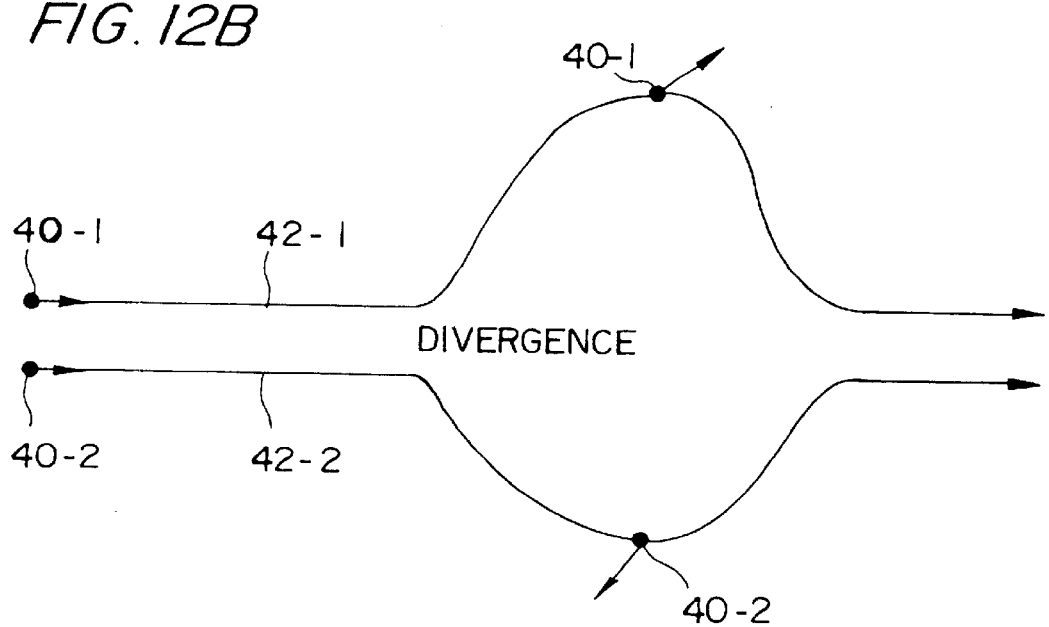

In particular, an exceptionally dramatic effect can be achieved by making the first movement path 42-1 of the first viewpoint 40-1 and the second movement path 42-2 of the second viewpoint 40-2 diverge when a given circumstance occurs, as shown in FIG. 12B. In other words, it is possible to enjoy the shooting game by allowing the character objects of the 1P and 2P players to move along different ways, as shown at E5 and E6 in FIG. 5 and in FIGS. 8B and 8C. Such a dramatic effect cannot be achieved with the game machine of FIG. 1B in which the viewpoints of the 1P and 2P players are always the same.

Figure 13:
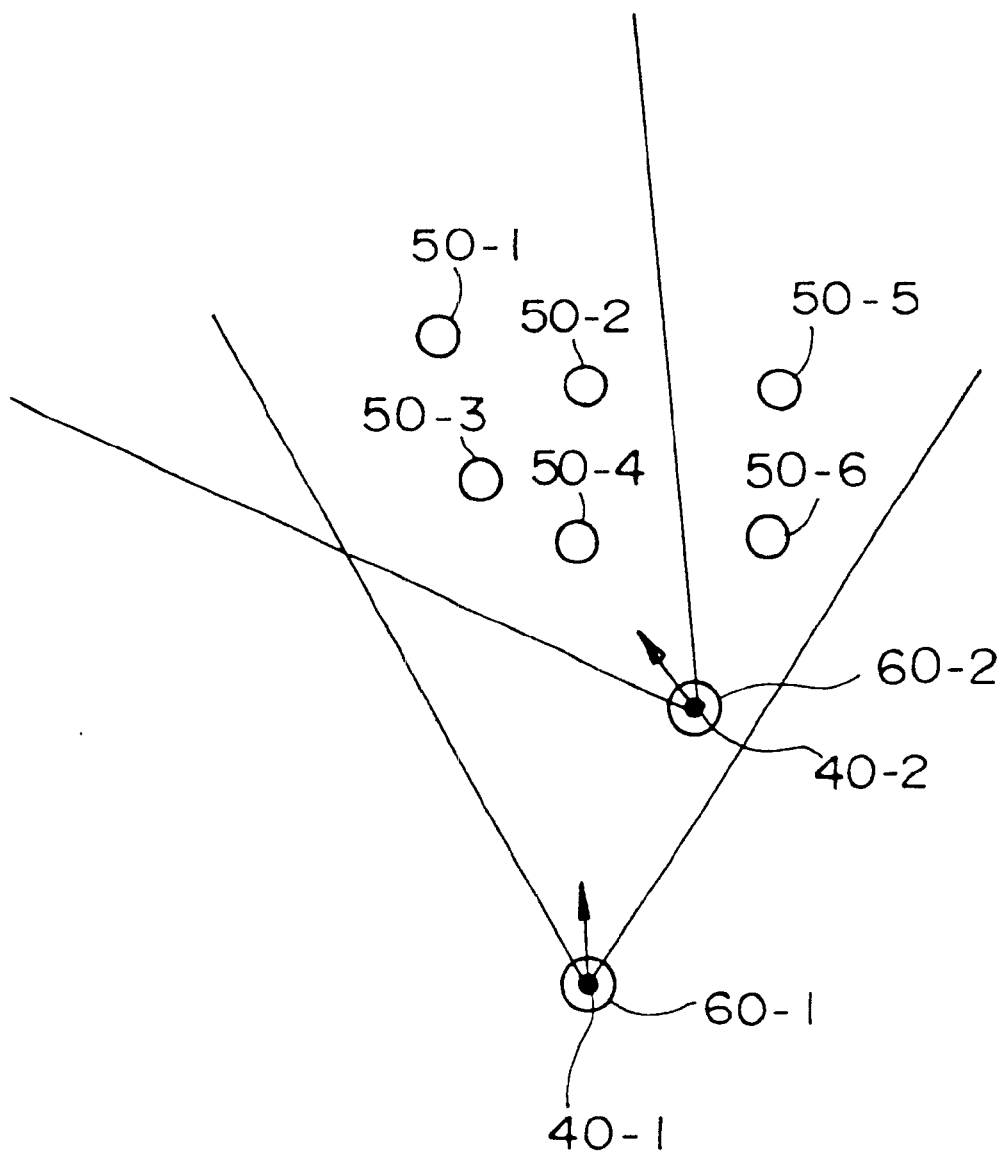
FIG. 13 illustrates a method of viewpoint control such that a target object and a character object enter the field of view of the other viewpoint.

A third characteristic of this embodiment is that a view point of one of the 1P and 2P players is controlled in such a manner that a target object and the character object corresponding to the other of the players enter the field of view of the viewpoint of one of the players. In other words, the first viewpoint 40-1 could be controlled in such a manner that target objects 50-1 to 50-6 and the 2P character object 60-2 of the 2P player both enter the field of view of the first viewpoint 40-1 of the 1P player, as shown by way of example in FIG. 13. This makes it possible for one player to enjoy shooting at target objects while viewing the circumstances of the character object of the other player, as shown in FIGS. 6C, 7A, 7B, 7C, 10B, and 10C. Thus the sensation of cooperating with the other player is heightened, improving the virtual realism.

A fourth characteristic of this embodiment is that the first and second viewpoints and target objects are controlled in accordance with a difference between the game results of the 1P and 2P players.

For example, assume that the target objects 50-1 to 50-4 that are present within the field of view of the second viewpoint 40-2 of the 2P player in FIG. 14A have been completely destroyed but target objects 50-5 to 50-8 that are present within the field of view of the first viewpoint 40-1 of the 1P player have not been completely destroyed. In such a case, the second viewpoint 40-2 moves to a support point so that the remaining target objects 50-5 to 50-8 enter the field of view of the second viewpoint 40-2. This makes it possible to represent covering firing such as that at E7 in FIG. 5, further increasing the interest of the game.

Figure 15:
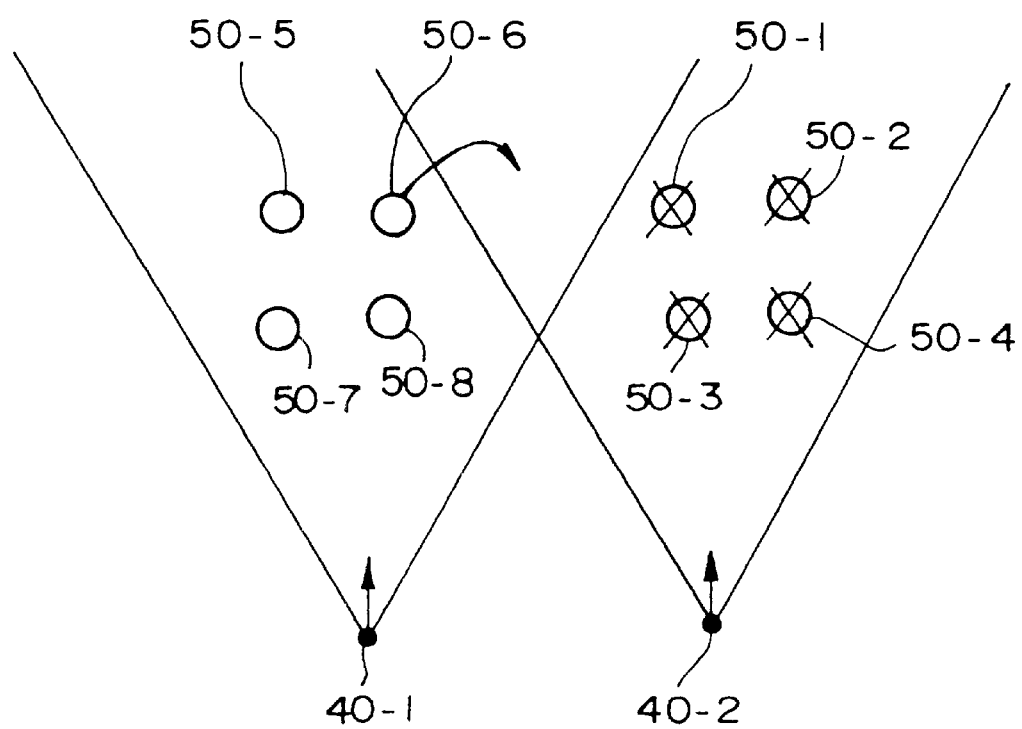
FIG. 15 illustrates a method of causing a target object to move into the common field of view.

Note that the viewpoint is shown to move in FIG. 14, but the target objects could equally well move instead, as shown in FIG. 15. In other words, if the target objects 50-1, 50-2, 50-3, and 50-4 that are present within the field of view of the second viewpoint 40-2 of the 2P player have been completely destroyed, the target object 50-6 could move into the common field of view between the first and second viewpoints 40-1 and 40-2. This makes it possible to avoid occurrences such as the 2P player having to wait until the 1P player has finished playing this part of the game. This enables the implementation of a smooth game progression.

Note that the target object 50-6 could be moved into a region that is not within the common field of view of the first and second viewpoints 40-1 and 40-2 but within the field of view of the second viewpoint 40-2. It is also not necessary for the moved target object 50-6 to come from within the field of view of the first viewpoint 40-1. In other words, it could be moved from outside the fields of view of the first and second viewpoints 40-1 and 40-2, or it could be a newly generated target object. This means that the target objects can be controlled in such a manner that, when the target objects that are within the field of view of one of the viewpoints of the 1P and 2P players have been completely destroyed, another target object moves into the field of view of one of viewpoints.

Figure 16A:
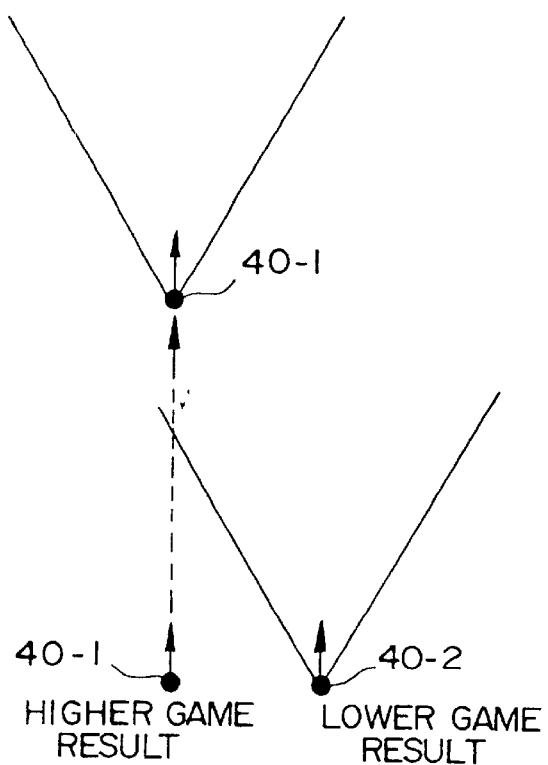
FIGS. 16A and 16B illustrate a method of causing the viewpoint of the player with the higher game result to proceed ahead.

In FIG. 16A, the game result of the 1P player is higher than the game result of the 2P player, so the first viewpoint 40-1 advances ahead of the second viewpoint 40-2. This makes it possible for a game of the player with the higher game result to progress further, as shown in FIGS. 10A, 10B, 10C, and 11B. Thus rivalry between fellow players can be stimulated they are playing cooperatively, which increases the enthusiasm and degree of absorption of the players with respect to the game.

Figure 16B:
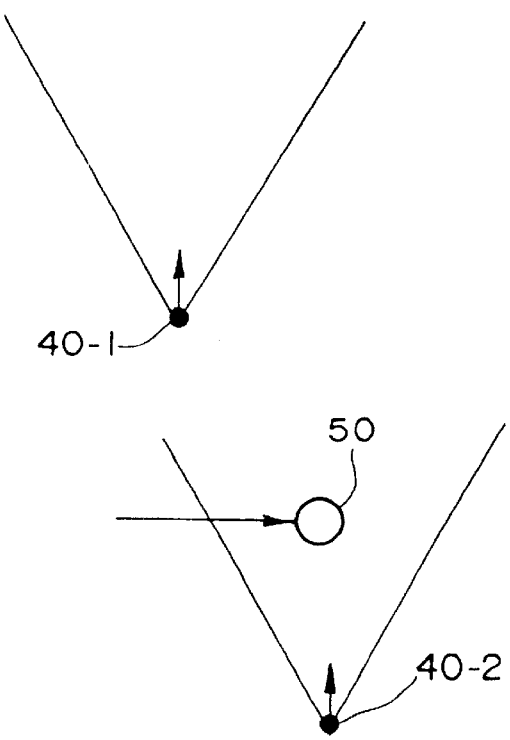

In FIG. 16B, when the first viewpoint 40-1 has advanced ahead of the second viewpoint 40-2, another target object 50 is made to appear within the field of view of the second viewpoint 40-2, in the region between the first and second viewpoints 40-1 and 40-2. This makes it possible to represent situations such as those in which target objects appear or do not appear in accordance with the distance separating the 1P character object and the 2P character object, as shown in FIG. 10C, which increases the variety of game dramatizations.

Figure 17A:
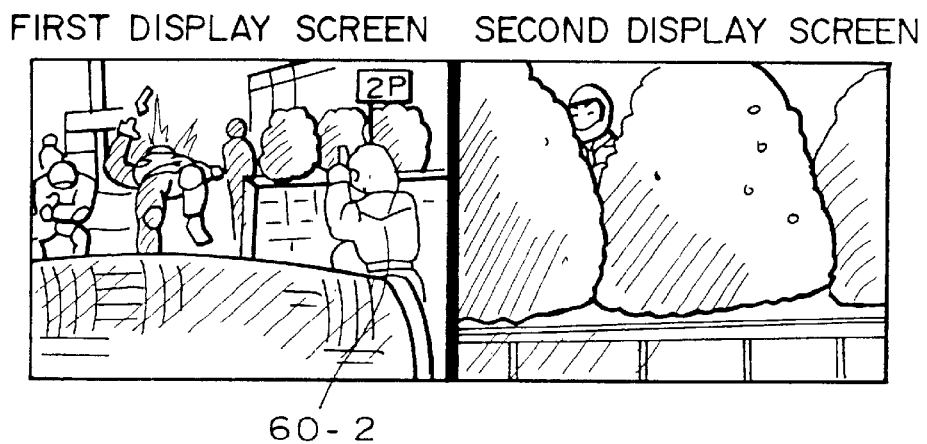
FIGS. 17A and 17B show examples of images generated when the character object of an ally has been shot mistakenly.
Figure 17B:
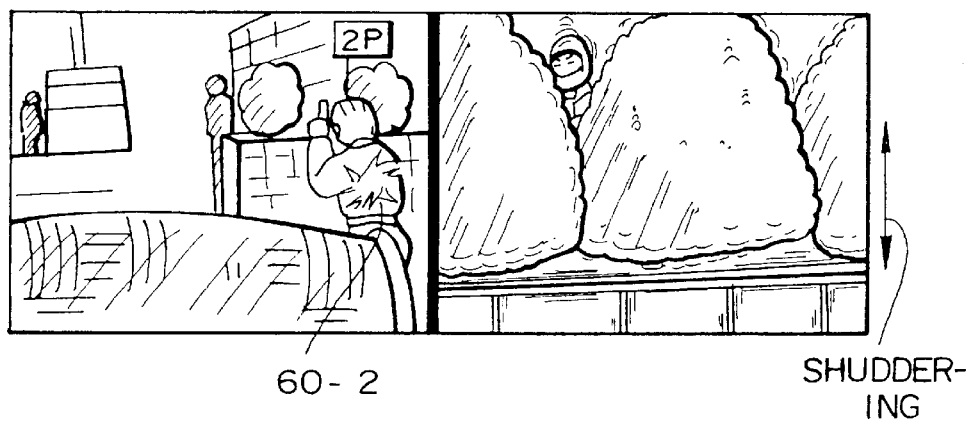

A fifth characteristic of this embodiment is that, if a shot from one of the 1P and 2P players hits the character object corresponding to the other player, the image that is output to the other display screen is made to change. In other words, consider a case in which the 2P character object 60-2 of the 2P player is displayed on the first display screen, as shown in FIG. 17A by way of example. At this point, assume that a shot from the 1P player mistakenly hits the 2P character object 60-2. In this case, this embodiment performs an action such as make the second display screen shudder (vibrate), as shown in FIG. 17B. This makes it possible to indicate to the 2P player that he has been hit by a shot from the 1P player. This enables an even further increase in the virtual realism of the gun battle. Such dramatic game effects cannot be achieved with the game machine of FIG. 1B in which the viewpoints of the 1P and 2P players are the same.

Although the method shown in FIG. 17B of varying the image on the second display screen is to make the second display screen shudder, the present invention is not limited thereto and other methods could be used to vary this image. For example, various other methods could be applied, such as displaying a mark indicating friendly fire on the second display screen.

A sixth characteristic of this embodiment is that a check is performed to determine whether or not a shot from the 1P or 2P player has hit a target object, based on first and second trajectories (paths) specified by the first and second viewpoints and two-dimensional positions on the first and second display screens that are indicated by the handgun-shaped controllers of the 1P and 2P players.

Figure 18A:
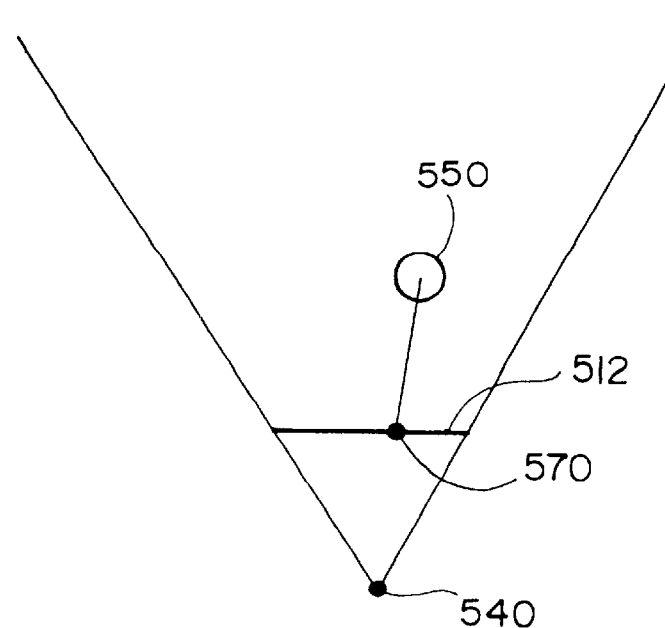
FIG. 18A illustrates a prior-art hit check method and FIG. 18B illustrates a hit check method of this embodiment.

In other words, in a prior-art gun-wielding game such as that shown in FIG. 1B, a determination as to whether a shot has hit or missed is done by determining whether or not the position (projected target object position) 570 on the display screen 512 of a target object 550 matches the indicated position of the handgun-shaped controller (the position at which the handgun-shaped controller is pointing), as shown in FIG. 18A. In FIG. 1B, since a viewpoint 540 of the first and second players 520-1 and 520-2 is the same, a serious problem does not arise during the determination of hit or miss by this method.

Figure 18B:
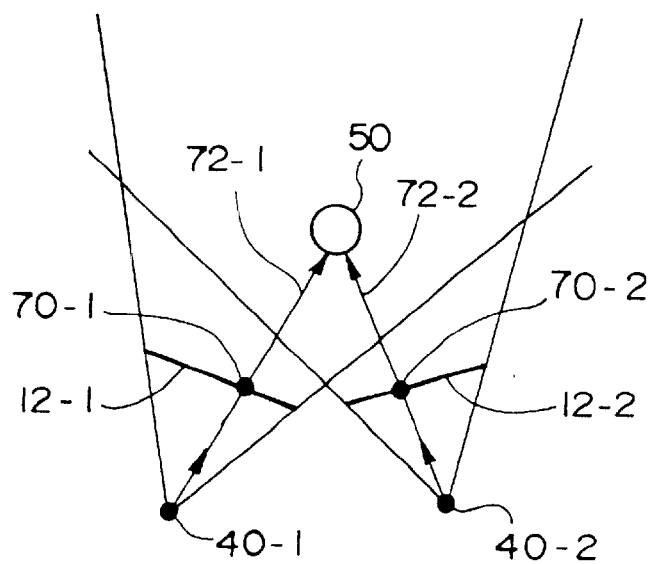

With this embodiment of the invention, the first and second viewpoints 40-1 and 40-2 of the 1P and 2P players are different, as shown in FIG. 18B. Therefore, a first trajectory 72-1 followed by a shot from the 1P player is aimed in a different direction from a second trajectory 72-2 followed by a shot from the 2P player. In this case, if hit or miss were determined by the method shown in FIG. 18A, a problem would occur, as described below. That is to say, the first and second trajectories 72-1 and 72-2 are aimed in different directions within the object space in practice, so shots travelling along these trajectories will tend to hit a target object in different manners. A shot travelling along the first trajectory 72-1, for example, will hit the front surface of the target object 50 and a shot travelling along the second trajectory 72-2 will hit a right side surface of the target object 50. To increase the realism of the game, it is preferable to make the motions of the target object different after it is hit, depending on whether the shot hits the front surface or the right side surface thereof. In other words, it is is preferable to play the motion of the target object in such a manner that it falls backwards if hit on the front surface, or falls to the left if hit on the right side surface.

However, if the hit check is performed by the method of FIG. 18A, it will not be possible to determine the direction of a shot that has hit the target object. It is therefore not possible to implement a representation such as a change in motion in the target object corresponding to the direction of a hit.

With this embodiment, the check of whether or not a shot from the 1P or 2P player has hit the target object 50 is based on the first and second trajectories 72-1 and 72-2 that are specified by the first and second viewpoints 40-1 and 40-2 and two-dimensional positions 70-1 and 70-2 on the first and second display screens 12-1 and 12-2 that are indicated by the handgun-shaped controllers of the 1P and 2P players. The motion of the target object So after it has been hit can therefore be made to vary depending on the directions of the first and second trajectories 72-1 and 72-2, which greatly increases the realism of the game.

Figure 19:
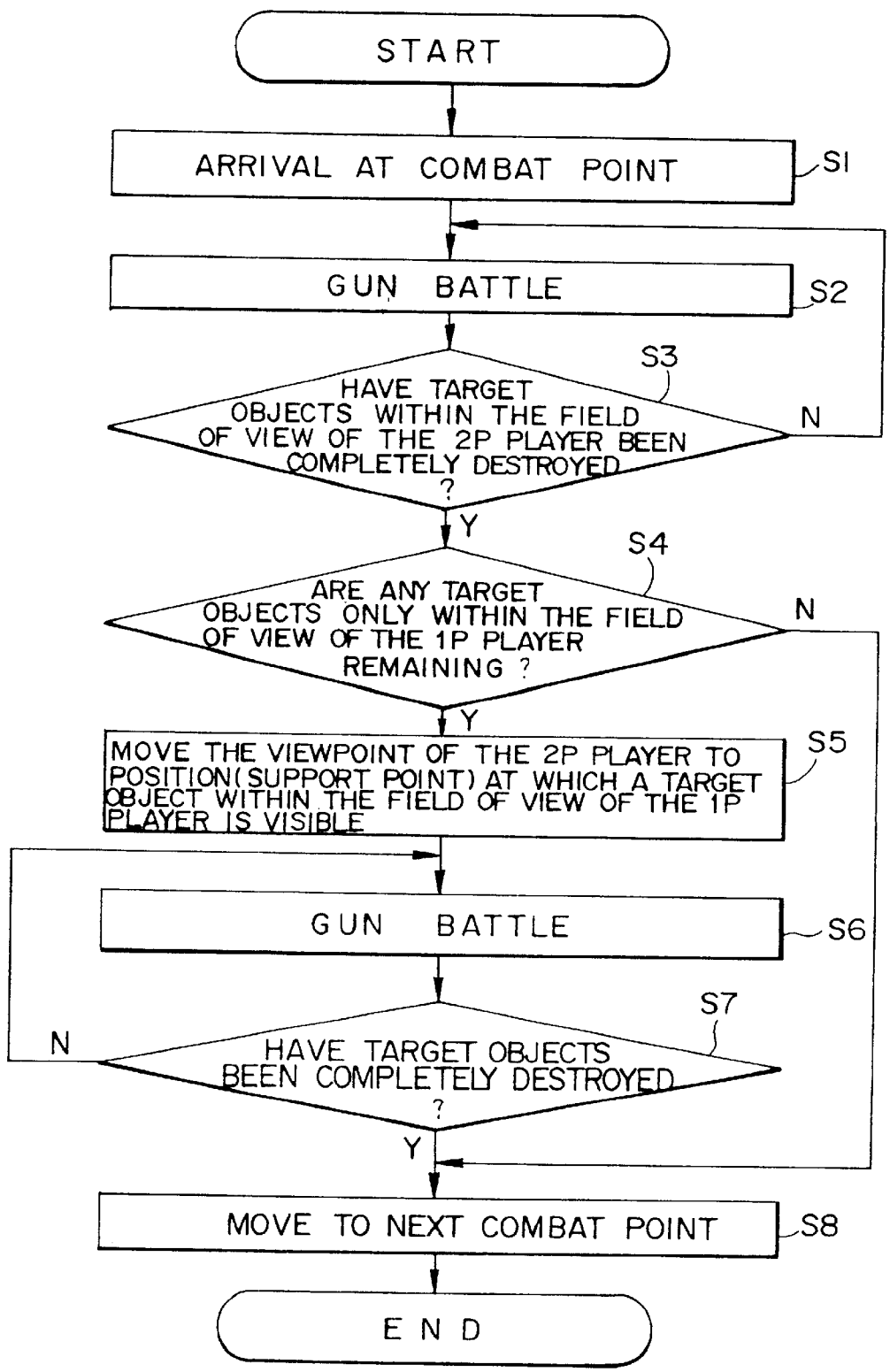
FIG. 19 is a flowchart illustrating a detailed processing example of this embodiment.
Figure 20:
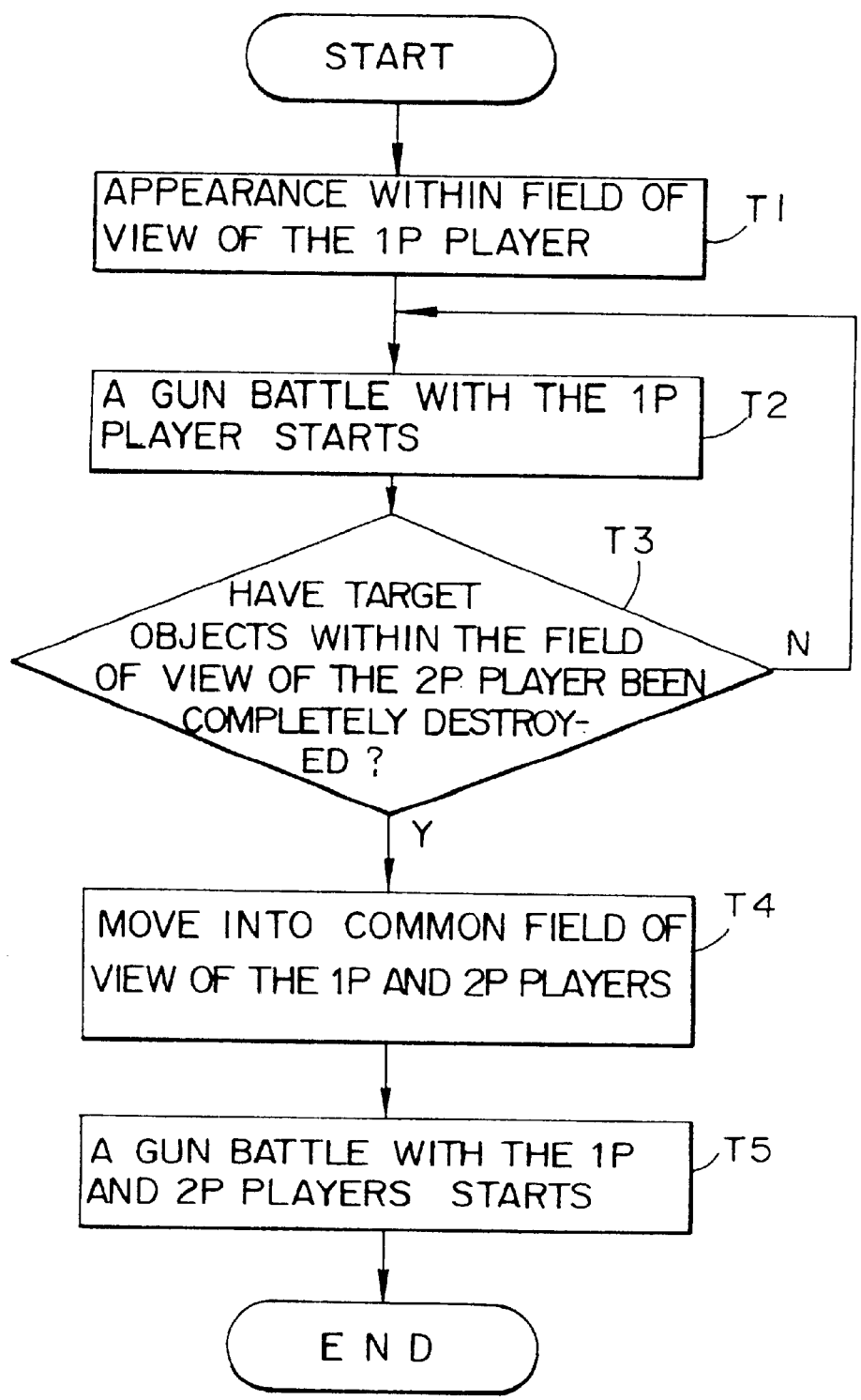
FIG. 20 is another flowchart illustrating a detailed processing example of this embodiment.

A detailed example of the processing of this embodiment of the invention will now be described, with reference to the flowcharts of FIGS. 19 and 20.

The flowchart of FIG. 19 concerns the processing of movements of the viewpoint to the support point, as previously described with reference to FIGS. 14A and 14B.

When each character object has reached a combat point and a gun battle starts (steps S1 and S2), the system determines whether or not the target objects present within the field of view of the 2P player have been completely destroyed (step S3).

If the target objects 50-1 to 50-4 have been completely destroyed, as shown in FIG. 14A, the system determines whether or not any target objects only within the field of view of the 1P player are remaining (whether or not they have been completely destroyed) (step S4).

If any of the target objects 50-5 to 50-8 remain, as shown in FIG. 14B, the viewpoint 40-2 (character object) of the 2P player is moved to a position (support point) at which these target objects 50-5 to 50-8 are visible (step S5). The gun battle continues until the target objects have been completely destroyed (steps S6 and S7), and, once they have been completely destroyed, the character objects move to the next combat point.

The above described setup makes it possible to control the viewpoints in accordance with a difference in game results between the players.

The flowchart of FIG. 20 concerns the processing of movements of the target objects within the common field of view, as previously described with reference to FIG. 15.

First of all, a target object appears within the field of view of the 1P player and a gun battle with the 1P player starts (steps T1 and T2).

The system determines whether or not the target objects present within the field of view of the 2P player have been completely destroyed (step T3). If the target objects 50-1 to 50-4 present within the field of view of the 2P player have been completely destroyed, as shown in FIG. 15, the target object 50-6 moves into the common field of view of the 1P and 2P players (step T4). Then a gun battle with the 1P and 2P players starts (step T5).

The above shows how it is possible to control the target objects in accordance with a difference in game results between the players.

Figure 21:
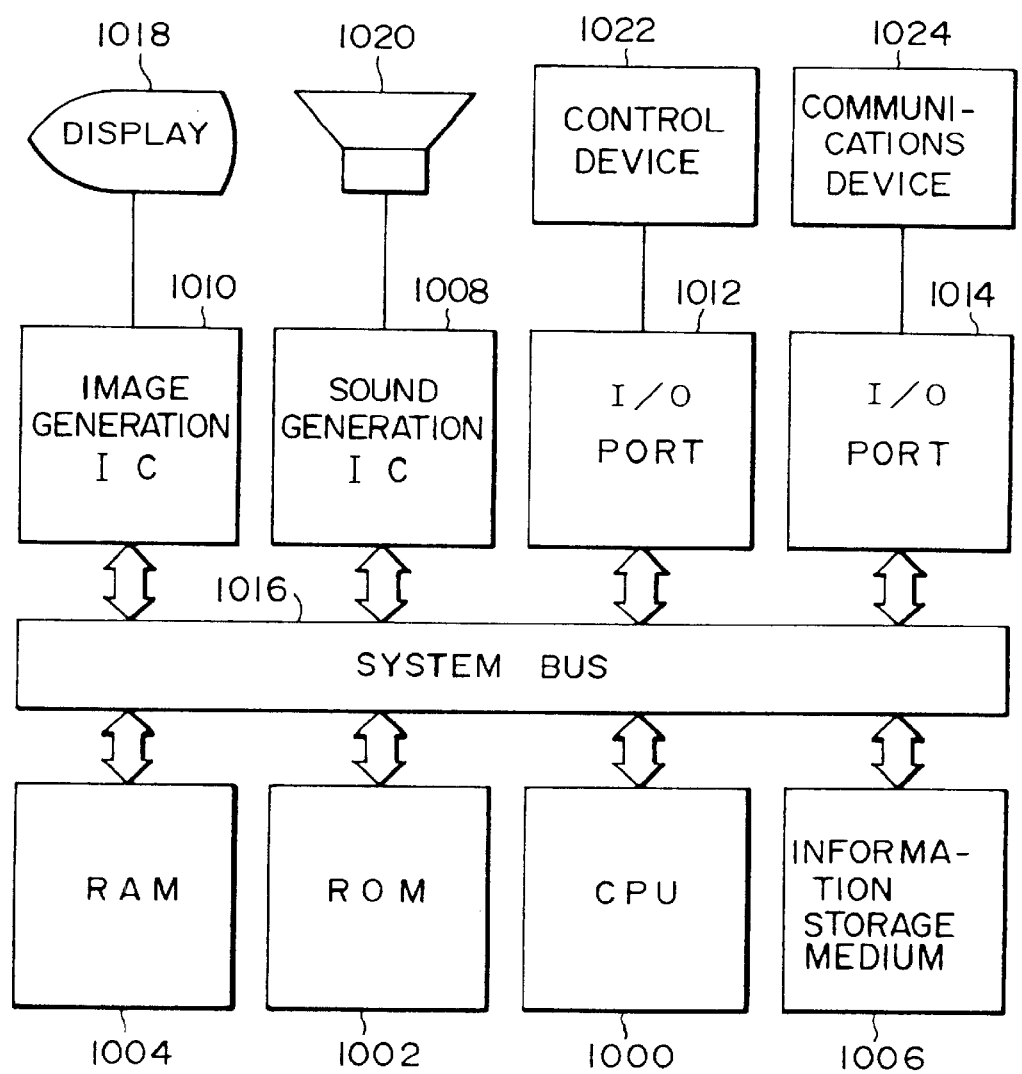
FIG. 21 shows an example of the configuration of hardware that can implement this embodiment.

The description now turns to an example of the configuration of hardware that can implement this embodiment of the invention, with reference to FIG. 21. In the apparatus shown in this figure, a CPU 1000, ROM 1002, RAM 1004, an information storage medium 1006, a sound generation IC 1008, an image generation IC 1010, and I/O ports 1012 and 1014 are connected together by a system bus 1016 so that data can be mutually transferred therebetween. A display 1018 is connected to the image generation IC 1010, a speaker 1020 is connected to the sound generation IC 1008, a control device 1022 is connected to the I/O port 1012, and a communications device 1024 is connected to the I/O port 1014.

A program and image data, sound data, or the like for representing display objects is mainly stored in the information storage medium 1006. Means such as a CD-ROM, game cassette, or DVD could be used as an information storage medium for storing a game program for a domestic game machine. Alternatively, memory such as ROM could be used for an arcade game machine, in which case the information storage medium 1006 is the ROM 1002.

The control device 1022 is equivalent to a game controller or operating panel and it is used as a device for inputting into the main unit of the device the results of decisions made by the player as the game progresses.

The CPU 1000 controls the entire device and processes data in accordance with a game program stored in the information storage medium 1006, a system program stored in the ROM 1002 (including initialization information for the entire device), and signals input through the control device 1022. The RAM 1004 is a storage means that is used as a work space for the CPU 1000, and specific details from the information storage medium 1006 or the ROM 1002, or the results of calculations by the CPU 1000, are stored therein. A data configuration having a logical structure suitable for implementing this embodiment of the invention (for example, the structure of object data and viewpoint control data) is constructed within this RAM or information storage medium.

The provision of the sound generation IC 1008 and the image generation IC 1010 in this type of device makes it possible to output game sounds and game images as required. The sound generation IC 1008 is an integrated circuit device that generates game sounds such as sound effects and background music, based on information stored in the information storage medium 1006 or the ROM 1002, and the thus generated game sounds are output by the speaker 1020. The image generation IC 1010 is an integrated circuit device that generates pixel information for output to the display 1018, based on image information that is sent from components such as the RAM 1004, the ROM 1002, and the information storage medium 1006. Note that a device called a head-mounted display (HMD) could also be used as the display 1018.

The communications device 1024 is designed to transfer various types of information used within the game machine to and from external devices, and it is used to send given information in accordance with a game program when connected to another game machine, or to send information such as a game program through a communications line.

The processing described with reference to FIGS. 2 to FIG. 18B is implemented by components such as the information storage medium 1006 that contains a game program for performing processing such as that shown in the flowcharts of FIGS. 19 and 20, the CPU 1000 that operates in accordance with that program, and the image generation IC 1010 and sound generation IC 1008. Note that the processing performed by the image generation IC 1010 and the sound generation IC 1008 could be performed in a software manner by means such as the CPU 1000 or an ordinary DSP.

An example of this embodiment applied to an arcade game machine is shown in the previously described FIG. 2. In this case, components such as a CPU, an image generation IC, and a sound generation IC are mounted on a system board 1106 built into the device. Information is stored in a memory 1108, which is the information storage medium on the system board 1106. This information comprises information such as information for performing processing for setting a plurality of objects, including a target object, within the object space, information for performing a hit check between a shot from a first player and the target object; information for performing a hit check between a shot from a second player and the target object; information for controlling a first viewpoint for the first player; information for controlling a second viewpoint for the second player; information for generating an image as seen from the first viewpoint within the object space and outputting the generated image to a first display screen for the first player; information for generating an image as seen from the second viewpoint within the object space and outputting the generated image to a second display screen for the second player; and information for controlling the first and second viewpoints in such a manner that the first viewpoint moves along a given first movement path and the second viewpoint moves along a given second movement path. This information is hereinafter called stored information. This stored information comprises at least one type of information, such as program coding for performing the above described processing, image information, sound information, shape information for display objects, table data, list data, or player information.

Figure 22A:
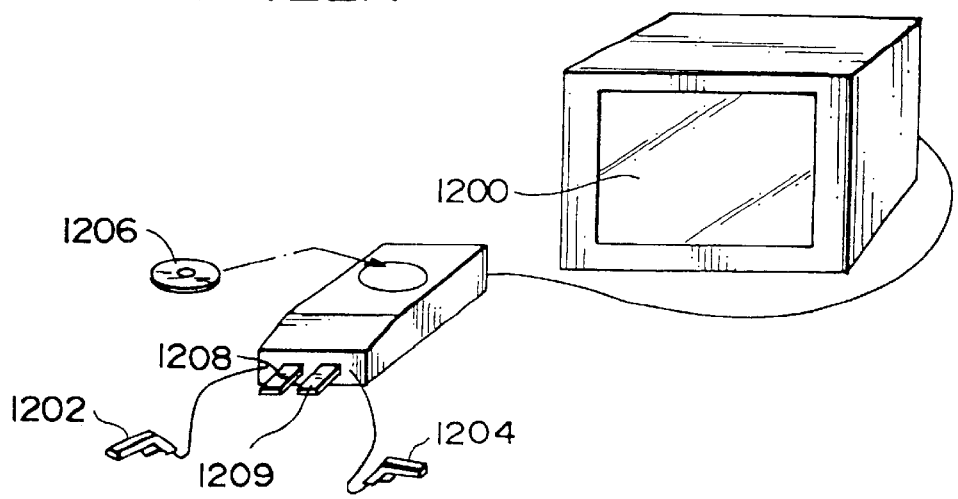
FIGS. 22A and 22B show examples of various devices to which this embodiment is applied.

An example of this embodiment applied to a domestic game machine is shown in FIG. 22A Players enjoy the game by manipulating game controllers 1202 and 1204 while viewing a game image shown on a display 1200. In this case, the above described stored information is stored in a CD-ROM 1206 or IC cards 1208 and 1209, which are information storage media that can be freely inserted into and removed from the main unit.

Figure 22B:
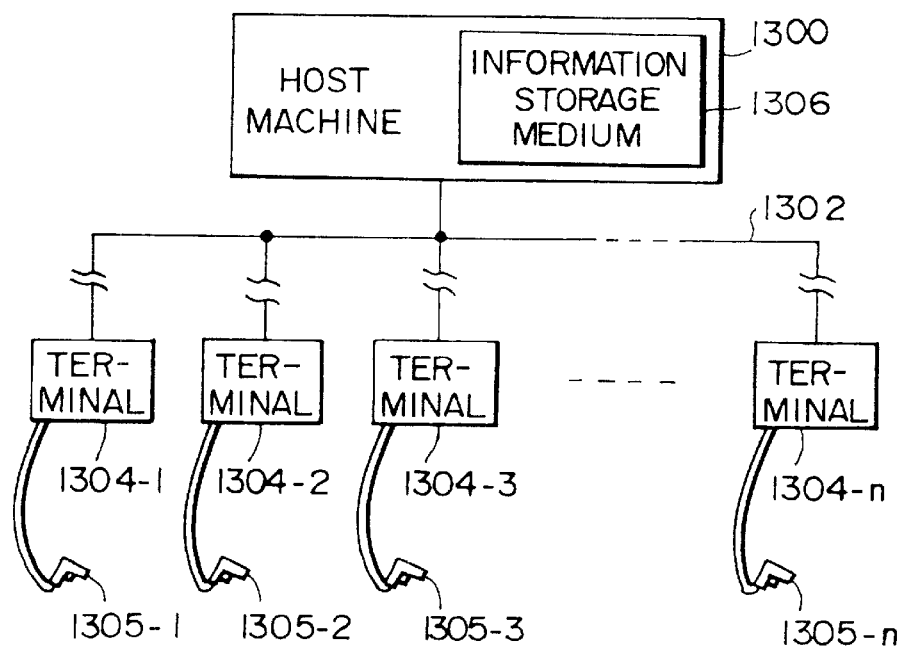

An example of this embodiment applied to a game machine is shown in FIG. 22B, where the game machine comprises a host machine 1300 and terminals 1304-1 to 1304-n connected to the host machine 1300 by communications lines 1302. In this case, controllers 1305-1 to 1305-n are connected to each of the terminals 1304-1 to 1304-n, by way of example. The above is described stored information is stored in an information storage medium 1306 such as a magnetic disk device, magnetic tape device, or memory that can be controlled by the host machine 1300. Each of the terminals 1304-1 to 1304-n has a CPU, an image generation IC, and a sound generation IC. In addition, if game images and sounds can be generated thereby in a stand-alone manner, means such as a game program for generating game images and sounds is transferred to the terminals 1304-1 to 1304-n from the host machine 1300. On the other hand, if they cannot be generated in a stand-alone manner, the host machine 1300 creates the game images and sounds then transfers them to the terminals 1304-1 to 1304-n for output by those terminals.

Note that this invention is not limited to the above described embodiments and it can be implemented in various other ways.

Figure 23:
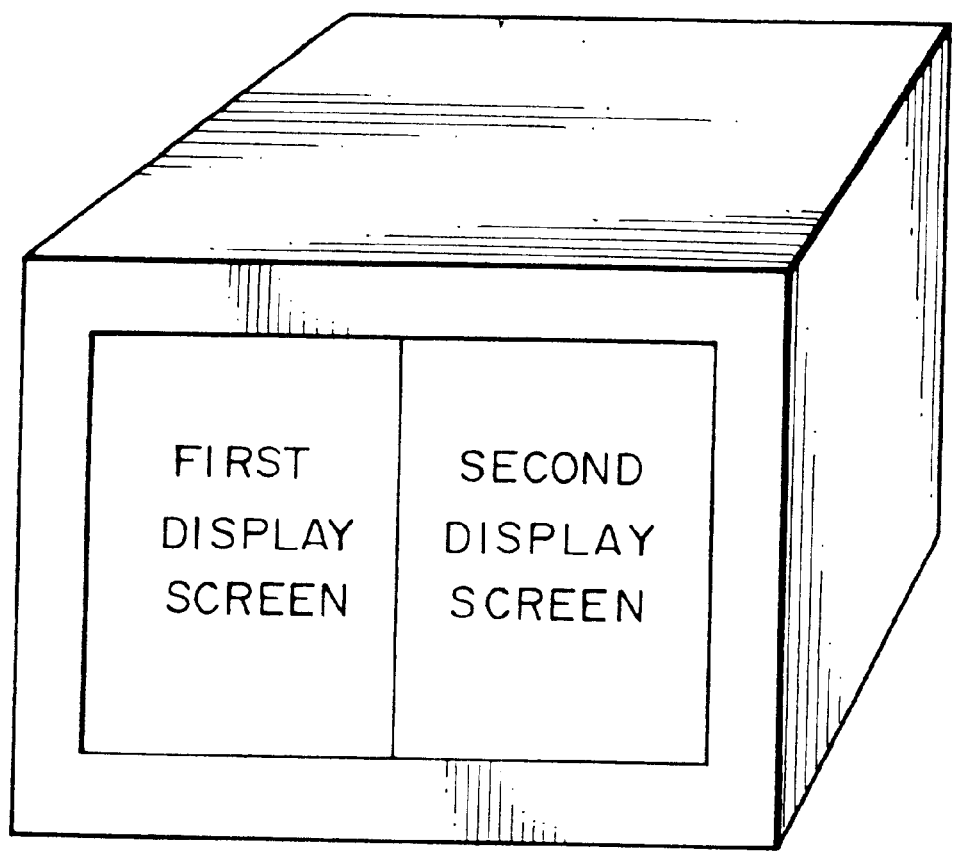
FIG. 23 illustrates an example of a method of displaying first and second display screens on a single screen.

For example, instead of displaying two images on separate first and second display screens, they could be displayed on a single screen, as shown in FIG. 23. Such a method is particularly useful when this invention is applied to a domestic game machine, such as that shown in FIG. 22A.

In addition, provision for three or more display screens (three or more players) is also included in the scope of this invention.

Processing such as that for hit checks, viewpoint control, and image generation could be done by a plurality of processing sections as shown in FIG. 3 or it could be done by a single processing section as shown in FIG. 4.

The viewpoint control method described with reference to is FIGS. 12A and 12B is particularly preferable, but the invention is not limited thereto.

Similarly, the hit check method described with reference to FIG. 18B is particularly preferable, but the invention is not limited thereto.

Figure 24:
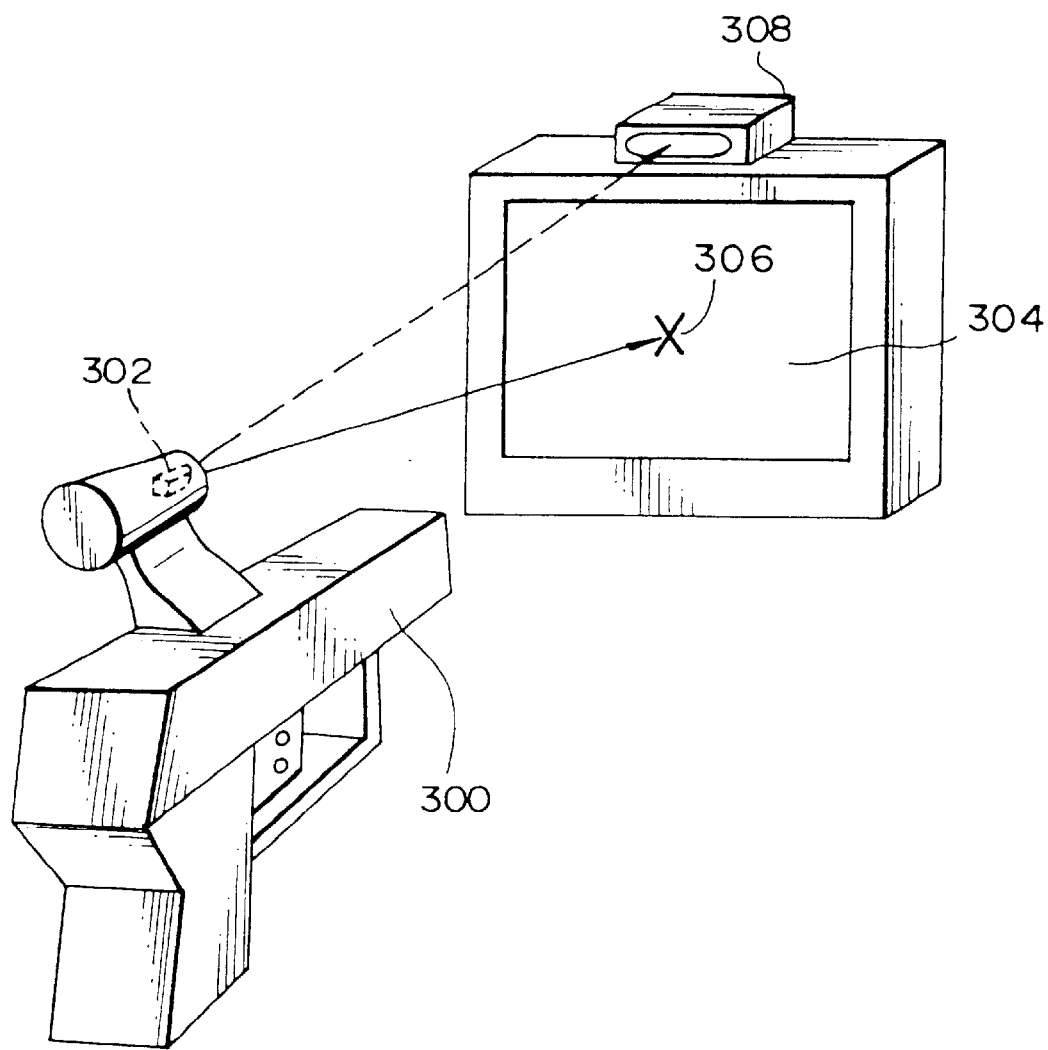
FIG. 24 illustrates another example of a method of detecting the coordinates of a position indicated by a shooting device.

Furthermore, the method of detecting the coordinates of the two-dimensional position indicated by a shooting device is not limited to that described with reference to FIG. 3. For example, a light-emitting device 302 that emits a beam of light such as an infrared beam could be provided as a shooting device 300, as shown in FIG. 24. The light from this light-emitting device 302 is received by a light-receiving device 308 provided on a display screen 304 side. This detects the coordinates of a two-dimensional position 306 indicated by the shooting device 300.

With this implementation of the present invention, the coordinates of the indicated position could be detected by the transfer of light generated from the display screen side, or the coordinates of the indicated position could equally well be detected by the transfer of light generated from the shooting device side. Alternatively, the coordinates of the indicated position could be detected by both light generated from the display screen side and light generated from the shooting device side.

When light from the display screen side is used, the detection of the coordinates of the indicated position could be based, not on the scan beam from the indicated position, but on light detected from a light-emitting device that has been placed on the display screen side.

This invention is also not limited to gun-wielding games using handgun-shaped controllers; it can be applied to shooting games using shooting devices that are modeled on firearms such as rifles, laser-guns, or cannons, or to shooting games of the type in which shooting devices are fixed to a housing of a game machine.

This invention is also not limited to domestic and arcade game machines; it can be applied to various other image generation devices such as simulators, large-scale attractions in which many players can participate, personal computers, multimedia terminals, and system boards that create game images.

What is claimed is:

1. An image generation device for generating an image that enables a player to use a shooting device to shoot at at least one target object within an object space, said image generation device comprising:

means for performing processing for setting a plurality of objects, including a target object, within said object space;

means for performing a hit check between a shot from a first player and a target object;

means for performing a hit check between a shot from a second player and a target object;

a first viewpoint controller for controlling a viewpoint for said first player;

a second viewpoint controller for controlling a viewpoint for said second player different than the viewpoint for the first player;

means for generating an image as seen from said first player's viewpoint within said object space and outputting said generated image to a first display screen for said first player;

means for generating an image as seen from said second player's viewpoint within said object space and outputting said generated image to a second display screen for said second player;

wherein at least one viewpoint of the first player and the viewpoint of the second player and a target object is controlled according to a difference in game results of the first and the second players; and wherein when a game result of one of said first and second players is greater than a game result of the other of said first and second players, the viewpoint of the one of said first and second players having the greater game result is made to proceed in advance of the viewpoint of the other of said first and second players.

2. The image generation device as defined in claim 1, wherein the viewpoint of the first player and the viewpoint of the second player are controlled in such a manner that the viewpoint of the first player moves along a given first movement path and the viewpoint of the second player moves along a given second movement path.

3. The image generation device as defined in claim 2, wherein said first movement path of the viewpoint of the first player and said second movement path of the viewpoint of the second player are made to diverge when a given circumstance occurs.

4. The image generation device as defined in claim 1, wherein character objects corresponding to each of said first and second players are provided within said object space; and wherein when a given circumstance occurs, a viewpoint of one of the first and second players is controlled in such a manner that a target object and said character object corresponding to a viewpoint of the other of said first and second players both enter into the field of view of said viewpoint of said one of said first and second players.

5. The image generation device as defined in claim 1, wherein when a target object that is present within the field of view as seen from the viewpoint of one of said first and second players has been destroyed but a target object that is present within the field of view as seen from the viewpoint of the other of said first and second players has not been destroyed, said viewpoint of the one of said first and second players is controlled in such a manner that said target object that is present within the field of view as seen from the viewpoint of the other of said first and second players enters the field of view as seen from the viewpoint of said one of said first and second viewpoints.

6. The image generation device as defined in claim 1, wherein when a target object that is present within the field of view as seen from the viewpoint of one of said first and second players has been destroyed, target object control is performed in such a manner that a target object enters the field of view as seen from the viewpoint of said one of said first and second players.

7. The image generation device as defined in claim 1, wherein when the viewpoint of one of said first and second players is proceeding in advance of the viewpoint of the other of said first and second players, a target object is caused to appear within the field of view of the viewpoint of the other of said first and second players, in a region between the viewpoint of one of said first and second viewpoints and the viewpoint of the other of said first and second players.

8. The image generation device as defined in claim 1, wherein character objects corresponding to each of said first and second players are provided within said object space; and wherein when a shot from one of said first and second players has hit said character object corresponding to the other of said first and second players, an image that is output to a display screen provided for said other player is made to change.

9. The image generation device as defined in claim 1, wherein a check is performed to determine whether or not a shot from said first player has hit a target objects, based on a first trajectory specified by the viewpoint of the first player and a two-dimensional position on said first display screen that is indicated by a shooting device of said first player;

wherein a check is performed to determine whether or not a shot from said second player has hit a target object, based on a second trajectory specified by the viewpoint of the second player and a two-dimensional position on said second display screen that is indicated by a shooting device or said second player; and wherein a motion of the target object is made to vary depending on at least one direction of the first trajectory and the second trajectory.

10. An information storage medium used in an image generation device for generating an image that enables a player to use a shooting device to shoot at at least one target object within an object space, said information storage medium comprising:

information for performing processing for setting a plurality of objects, including a target object, within said object space;

information for performing a hit check between a shot from a first player and a target object;

information for performing a hit check between a shot from a second player and a target object;

information for controlling a viewpoint for said first player;

information for controlling a viewpoint for said second player different than the viewpoint for the first player;

information for generating an image as seen from the viewpoint for the first player within said object space and outputting said generated image to a first display screen for said first player;

information for generating an image as seen from the viewpoint for the second player within said object space and outputting said generated image to a second display screen for said second player, wherein at least one of the viewpoint of the first player and the viewpoint of the second player and a target object is controlled in accordance with a difference in game results between the first and the second players, and wherein when a game result of one of said first and second players is greater than a game result of the other of said first and second players, the viewpoint of the one of said first and second players having the greater game result is made to proceed in advance of the viewpoint of the other of said first and second players.

11. The information storage medium as defined in claim 10, wherein the viewpoint of one of the first and second players and the viewpoint of the other of said first and second players are controlled in such a manner that the viewpoint of the first player moves along a given first movement path and the viewpoint of the second player moves along a given second movement path.

12. The information storage medium as defined in claim 11, wherein said first movement path of the viewpoint of the first player and said second movement path of the viewpoint of the second player are made to diverge when a given circumstance occurs.

13. The information storage medium as defined in claim 10, wherein character objects corresponding to each of said first and second players are provided within said object space; and wherein when a given circumstance occurs, the viewpoint of one of said first and second players is controlled in such a manner that a target object and said character object corresponding to the viewpoint of the other of said first and second players both enter into the field of view of the viewpoint of said one of said first and second players.

14. The information storage medium as defined in claim 10, wherein when a target object that is present within the field of view as seen from the viewpoint of one of said first and second players has been destroyed but a target object that is present within the field of view as seen from the viewpoint of the other of said first and second players has not been destroyed, said viewpoint of one of said first and second viewpoints is controlled in such a manner that said target object that is present within the field of view as seen from the viewpoint of said other of said first and second players enters the field of view as seen from the viewpoint of said one of said first and second players.

15. The information storage medium as defined in claim 10, wherein when a target object that is present within the field of view as seen from the viewpoint of one of said first and second players has been destroyed, target object control is performed in such a manner that a target object enters the field of view as seen from the viewpoint of said one of said first and second players.

16. The information storage medium as defined in claim 10, wherein when the viewpoint of one of said first and second players is proceeding in advance of the viewpoint of the other of said first and second players, a target object is caused to appear within the field of view of the viewpoint of said other of said first and second players, in a region between the viewpoint of one of said first and second players and the viewpoint of the other of said first and second players.

17. The information storage medium as defined in claim 10, wherein character objects corresponding to each of said first and second players are provided within said object space; and wherein when a shot from one of said first and second players has hit said character object corresponding to the other of said first and second players, an image that is output to a display screen provided for said other player is made to change.

18. The information storage medium as defined in claim 10, wherein a check is performed to determine whether or not a shot from said first player has hit a target object, based on a first trajectory specified by the viewpoint of the first player and a two-dimensional position on said first display screen that is indicated by a shooting device of said first player;

wherein a check is performed to determine whether or not a shot from said second player has hit a target object, based on a second trajectory specified by the viewpoint of the second player and a two-dimensional position on said second display screen that is indicated by a shooting device of said second player; and wherein a motion of the target object is made to vary depending on at least one direction of the first trajectory and the second trajectory.

19. An image generation device for generating an image that enables a player to use a shooting device to shoot at at least one target object within an object space, said image generation device comprising:

means for performing processing for setting a plurality of objects, including a target object within said object space;

means for performing a hit check between a shot from a first player and a target object;

means for performing a hit check between a shot from a second player and a target object;

a first viewpoint controller for controlling a viewpoint for said first player;

a second viewpoint controller for controlling a viewpoint for said second player different than the viewpoint for the first player;

means for generating an image as seen from said first player's viewpoint within said object space and outputting said generated image to a first display screen for said first player;

means for generating an image as seen from said second player's viewpoint within said object space and outputting said generated image to a second display screen for said second player; and wherein character objects corresponding to each of said first and second players are provided within said object space; and wherein when a given circumstance occurs, a viewpoint of one of the first and second players is controlled in such a manner that a target object and said character object corresponding to a viewpoint of the other of said first and second players both enter into the field of view of said viewpoint of said one of said first and second players.

20. An information storage medium used in an image generation device for generating an image that enables a player to use a shooting device to shoot at at least one target object within an object space, said information storage medium comprising:

information for performing processing for setting a plurality of objects, including a target object, within said object space;

information for performing a hit check between a shot from a first player and a target object;

information for performing a hit check between a shot from a second player and a target object;

information for controlling a viewpoint for said first player;

information for controlling a viewpoint for said second player different than the viewpoint for the first player;

information for generating an image as seen from the viewpoint for the first player within said object space and outputting said generated image to a first display screen for said first player; and information for generating an image as seen from the viewpoint for the second player within said object space and outputting said generated image to a second display screen for said second player, wherein character objects corresponding to each of said first and second players are provided within said object space; and wherein when a given circumstance occurs, a viewpoint of one of the first and second players is controlled in such a manner that a target object and said character object corresponding to a viewpoint of the other of said first and second players both enter into the field of view of said viewpoint of said one of said first and second players.

21. An image generation device for generating an image that enables a player to use a shooting device to shoot at at least one target object within an object space, said image generation device comprising:

means for performing processing for setting a plurality of objects, including a target object, within said object space;

means for performing a hit check between a shot from a first player and a target object;

means for performing a hit check between a shot from a second player and a target object;

a first viewpoint controller for controlling a viewpoint for said first player;

a second viewpoint controller for controlling a viewpoint for said second player different than the viewpoint for the first player;

means for generating an image as seen from said first player's viewpoint within said object space and outputting said generated image to a first display screen for said first player;

means for generating an image as seen from said second player's viewpoint within said object space and outputting said generated image to a second display screen for said second player; and wherein a check is performed to determine whether or not a shot from said first player has hit a target object, based on a first trajectory specified by the viewpoint of the first player and a two-dimensional position on said first display screen that is indicated by a shooting device of said first player;

wherein a check is performed to determine whether or not a shot from said second player has hit a target object, based on a second trajectory specified by the viewpoint of the second player and a two-dimensional position on said second display screen that is indicated by a shooting device of said second player; and wherein a motion of the target object is made to vary depending on at least one direction of the first trajectory and the second trajectory.

22. An information storage medium used in an image generation device for generating an image that enables a player to use a shooting device to shoot at at least one target object within an object space, said information storage medium comprising:

information for performing processing for setting a plurality of objects, including a target object, within said object space;

information for performing a hit check between a shot from a first player and a target object;

information for performing a hit check between a shot from a second player and a target object;

information for controlling a viewpoint for said first player;

information for controlling a viewpoint for said second player different than the viewpoint for the first player;

information for generating an image as seen from the viewpoint for the first player within said object space and outputting said generated image to a first display screen for said first player; and information for generating an image as seen from the viewpoint for the second player within said object space and outputting said generated image to a second display screen for said second player, wherein a check is performed to determine whether or not a shot from said first player has hit a target object, based on a first trajectory specified by the viewpoint of the first player and a two-dimensional position on said first display screen that is indicated by a shooting device of said first player;

wherein a check is performed to determine whether or not a shot from said second player has hit a target object, based on a second trajectory specified by the viewpoint of the second player and a two-dimensional position on said second display screen that is indicated by a shooting device of said second player; and wherein a motion of the target object is made to vary depending on at least one direction of the first and the second trajectory.

23. An image generation device for generating an image that enables a player to use a shooting device to shoot at at least one target object within an object space, said image generation device comprising:

means for performing processing for setting a plurality of objects, including a target object, within said object space;

means for performing a hit check between a shot from a first player and a target object;

means for performing a hit check between a shot from a second player and a target object;

a first viewpoint controller for controlling a viewpoint for said first player;

a second viewpoint controller for controlling a viewpoint for said second player different than the viewpoint for the first player;

means for generating an image as seen from said first player's viewpoint within said object space and outputting said generated image to a first display screen for said first player;

means for generating an image as seen from said second player's viewpoint within said object space and outputting said generated image to a second display screen for said second player, wherein at least one viewpoint of the first player and the viewpoint of the second player and a target object is controlled according to a difference in game results of the first and the second players, and when a target object that is present within the field of view as seen from the viewpoint of one of said first and second players has been destroyed but a target object that is present within the field of view as seen from the viewpoint of the other of said first and second players has not been destroyed, said viewpoint of the one of said first and second players is controlled in such a manner that said target object that is present within the field of view as seen from the viewpoint of the other of said first and second players enters the field of view as seen from the viewpoint of said one of said first and second viewpoints.

24. An image generation device for generating an image that enables a player to use a shooting device to shoot at at least one target object within an object space, said image generation device comprising;

means for performing processing for setting a plurality of objects, including a target object, within said object space;

means for performing a hit check between a shot from a first player and a target object;

means for performing a hit check between a shot from a second player and a target object;

a first viewpoint controller for controlling a viewpoint for said first player;

a second viewpoint controller for controlling a viewpoint for said second player different than the viewpoint for the first player;

means for generating an image as seen from said first player's viewpoint within said object space and outputting said generated image to a first display screen for said first player;

means for generating an image as seen from said second player's viewpoint within said object space and outputting said generated image to a second display screen for said second player, wherein at least one viewpoint of the first player and the viewpoint of the second player and a target object is controlled according to a difference in game results of the first and the second players, and when a target object that is present within the field of view as seen from the viewpoint of one of said first and second players has been destroyed, target object control is performed in such a manner that a target object enters the field of view as seen from the viewpoint of said one of said first and second players.

25. An information storage medium used in an image generation device for generating an image that enables a player to use a shooting device to shoot at at least one target object within an object space, said information storage medium comprising:

information for performing processing for setting a plurality of objects, including a target object, within said object space;

information for performing a hit check between a shot from a first player and a target object;

information for performing a hit check between a shot from a second player and a target object;

information for controlling a viewpoint for said first player;

information for controlling a viewpoint for said second player different than the viewpoint for the first player;

information for generating an image as seen from the viewpoint for the first player within said object space and outputting said generated image to a first display screen for said first player; and information for generating an image as seen from the viewpoint for the second player within said object space and outputting said generated image to a second display screen for said second player, wherein at least one of the viewpoint of the first player and the viewpoint of the second player and a target object is controlled in accordance with a difference in game results between the first and the second players, and when a target object that is present within the field of view as seen from the viewpoint of one of said first and second players has been destroyed but a target object that is present within the field of view as seen from the viewpoint of the other of said first and second players has not been destroyed, said viewpoint of one of said first and second viewpoints is controlled in such a manner that said target object that is present within the field of view as seen from the viewpoint of said other of said first and second players enters the field of view as seen from the viewpoint of said one of said first and second players.

26. An information storage medium used in an image generation device for generating an image that enables a player to use a shooting device to shoot at at least one target object within an object space, said information storage medium comprising:

information for performing processing for setting a plurality of objects, including a target object, within said object space;

information for performing a hit check between a shot from a first player and a target object;

information for performing a hit check between a shot from a second player and a target object;

information for controlling a viewpoint for said first player;

information for controlling a viewpoint for said second player different than the viewpoint for the first player;

information for generating an image as seen from the viewpoint for the first player within said object space and outputting said generated image to a first display screen for said first player; and information for generating an image as seen from the viewpoint for the second player within said object space and outputting said generated image to a second display screen for said second player, wherein at least one of the viewpoint of the first player and the viewpoint of the second player and a target object is controlled in accordance with a difference in game results between the first and the second players, and when a target object that is present within the field of view as seen from the viewpoint of one of said first and second players has been destroyed, target object control is performed in such a manner that a target object enters the field of view as seen from the viewpoint of said one of said first and second players.

* * * * *